(12) United States Patent
Kim et al.

(10) Patent No.: US 12,238,695 B2
(45) Date of Patent: Feb. 25, 2025

(54) METHOD AND APPARATUS FOR TRANSMITTING AND RECEIVING PDCCH IN WIRELESS COMMUNICATION SYSTEM

(71) Applicant: LG Electronics Inc., Seoul (KR)

(72) Inventors: Hyungtae Kim, Seoul (KR); Jiwon Kang, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 344 days.

(21) Appl. No.: 17/563,679

(22) Filed: Dec. 28, 2021

(65) Prior Publication Data

US 2022/0217694 A1    Jul. 7, 2022

(30) Foreign Application Priority Data

Dec. 28, 2020 (KR) .................. 10-2020-0185085
Aug. 5, 2021 (KR) .................. 10-2021-0103400
Oct. 1, 2021 (KR) .................. 10-2021-0131007

(51) Int. Cl.
*H04W 72/044* (2023.01)
*H04B 7/06* (2006.01)
(Continued)

(52) U.S. Cl.
CPC ........ *H04W 72/046* (2013.01); *H04B 7/0626* (2013.01); *H04L 1/1864* (2013.01); *H04W 72/23* (2023.01)

(58) Field of Classification Search
CPC . H04W 72/046; H04W 72/23; H04W 72/232; H04W 72/446; H04W 72/1273;
(Continued)

(56) References Cited

U.S. PATENT DOCUMENTS

2021/0320701 A1* 10/2021 Huang ................ H04B 7/0626

FOREIGN PATENT DOCUMENTS

| KR | 20200044757 | 4/2020 |
| KR | 20200084853 | 7/2020 |
| WO | WO 2020090097 | 9/2021 |

OTHER PUBLICATIONS

International Search Report and Written Opinion in International Appln. No. PCT/KR2021/019742, dated Apr. 7, 2022, 6 pages (with English translation).

(Continued)

*Primary Examiner* — Jianye Wu
(74) *Attorney, Agent, or Firm* — Fish & Richardson P.C.

(57) ABSTRACT

A method and an apparatus of transmitting and receiving a physical downlink control channel (PDCCH) in a wireless communication system is disclosed. A method of receiving a physical downlink control channel (PDCCH) according to an embodiment of the present disclosure may include receiving, from a base station, configuration information related to one or more search space sets for the PDCCH; and based on overlapping of one or more monitoring occasions in a plurality of control resource sets (CORESETs) with different QCL (quasi co-location) configurations for a spatial reception parameter, receiving, from the base station, the PDCCH in a first CORESET with a first QCL configuration for the spatial reception parameter and a second CORESET with a second QCL configuration for the spatial reception parameter among the plurality of CORESET. The first CORESET may be determined based on a predetermined priority rule, and the second CORESET may be determined as a CORESET associated with a second search space set linked to a first search space set associated with the first CORESET for transmission of the PDCCH, and the configuration informa- (Continued)

tion may include information on the link between the first search space set and the second search space set.

12 Claims, 11 Drawing Sheets

(51) Int. Cl.
*H04L 1/1829* (2023.01)
*H04W 72/23* (2023.01)

(58) Field of Classification Search
CPC ... H04W 72/231; H04B 7/0626; H04B 7/024; H04L 1/1864; H04L 1/0038; H04L 1/1812
See application file for complete search history.

(56) References Cited

OTHER PUBLICATIONS

Vivo, "Remaining issues on aperiodic CSI-RS triggering," R1-2000348, 3GPP TSG RAN WG1 #100, Feb. 24-Mar. 6, 2020, 5 pages.
Lenovo, Motorola Mobility, "Enhancements on Multi-TRP for PDCCH, PUCCH and PUSCH," R1-2008911, 3GPP TSG RAN WG1 #103-e, Oct. 26-Nov. 13, 2020, 15 pages.

* cited by examiner

METHOD AND APPARATUS FOR TRANSMITTING AND RECEIVING PDCCH IN WIRELESS COMMUNICATION SYSTEM

CROSS-REFERENCE TO RELATED APPLICATIONS

This application claims the benefit of earlier filing date and right of priority to Korean Application No. 10-2020-0185085, filed on Dec. 28, 2020, Korean Application No. 10-2021-0103400, filed on Aug. 5, 2021, Korean Application No. 10-2021-0131007, filed on Oct. 1, 2021, the contents of which are all hereby incorporated by reference herein in their entirety.

TECHNICAL FIELD

The present disclosure relates to a wireless communication system, and in more detail, relates to a method and an apparatus of transmitting and receiving a physical downlink control channel (PDCCH) for downlink control information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus of transmitting and receiving a physical downlink control channel (PDCCH).

In addition, an additional technical object of the present disclosure is to provide a method and apparatus for transmitting and receiving a PDCCH for the same downlink control information based on multiple transmission and reception points (TRP).

In addition, an additional technical object of the present disclosure is to provide a method and apparatus for ensuring various processing times of a terminal when transmitting and receiving PDCCH for the same downlink control information based on multiple TRPs.

The technical objects to be achieved by the present disclosure are not limited to the above-described technical objects, and other technical objects which are not described herein will be clearly understood by those skilled in the pertinent art from the following description.

A method of receiving a physical downlink control channel (PDCCH) in a wireless communication system according to an aspect of the present disclosure may include receiving, from a base station, configuration information related to one or more search space sets for the PDCCH; and based on overlapping of one or more monitoring occasions in a plurality of control resource sets (CORESETs) with different QCL (quasi co-location) configurations for a spatial reception parameter, receiving, from the base station, the PDCCH in a first CORESET with a first QCL configuration for the spatial reception parameter and a second CORESET with a second QCL configuration for the spatial reception parameter among the plurality of CORESET. The first CORESET may be determined based on a predetermined priority rule, and the second CORESET may be determined as a CORESET associated with a second search space set linked to a first search space set associated with the first CORESET for transmission of the PDCCH, and the configuration information may include information on the link between the first search space set and the second search space set.

A method of transmitting a physical downlink control channel (PDCCH) in a wireless communication system according to an additional aspect of the present disclosure may include transmitting, to a terminal, configuration information related to one or more search space sets for the PDCCH; and based on overlapping of one or more monitoring occasions in a plurality of control resource sets (CORESETs) with different QCL (quasi co-location) configurations for a spatial reception parameter, transmitting, to the terminal, the PDCCH in a first CORESET with a first QCL configuration for the spatial reception parameter and/or a second CORESET with a second QCL configuration for the spatial reception parameter among the plurality of CORESETs. The first CORESET may be determined based on a predetermined priority rule, and the second CORESET may be determined as a CORESET associated with a second search space set linked to a first search space set associated with the first CORESET for transmission of the PDCCH, and the configuration information may include information on the link between the first search space set and the second search space set.

According to an embodiment of the present disclosure, reliability and robustness of downlink control information transmission and reception can be improved by transmitting and receiving a PDCCH for the same downlink control information based on multiple TRPs.

In addition, according to an embodiment of the present disclosure, when transmitting and receiving a PDCCH for the same downlink control information based on multiple TRPs, since various processing times of a terminal can be guaranteed, stable communication is possible.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
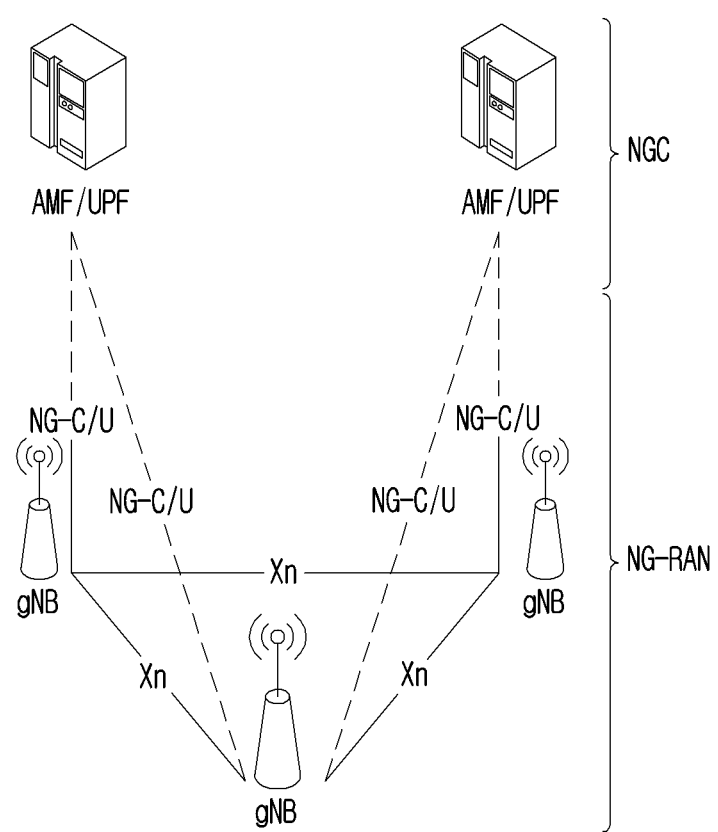
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone(UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.1-6 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
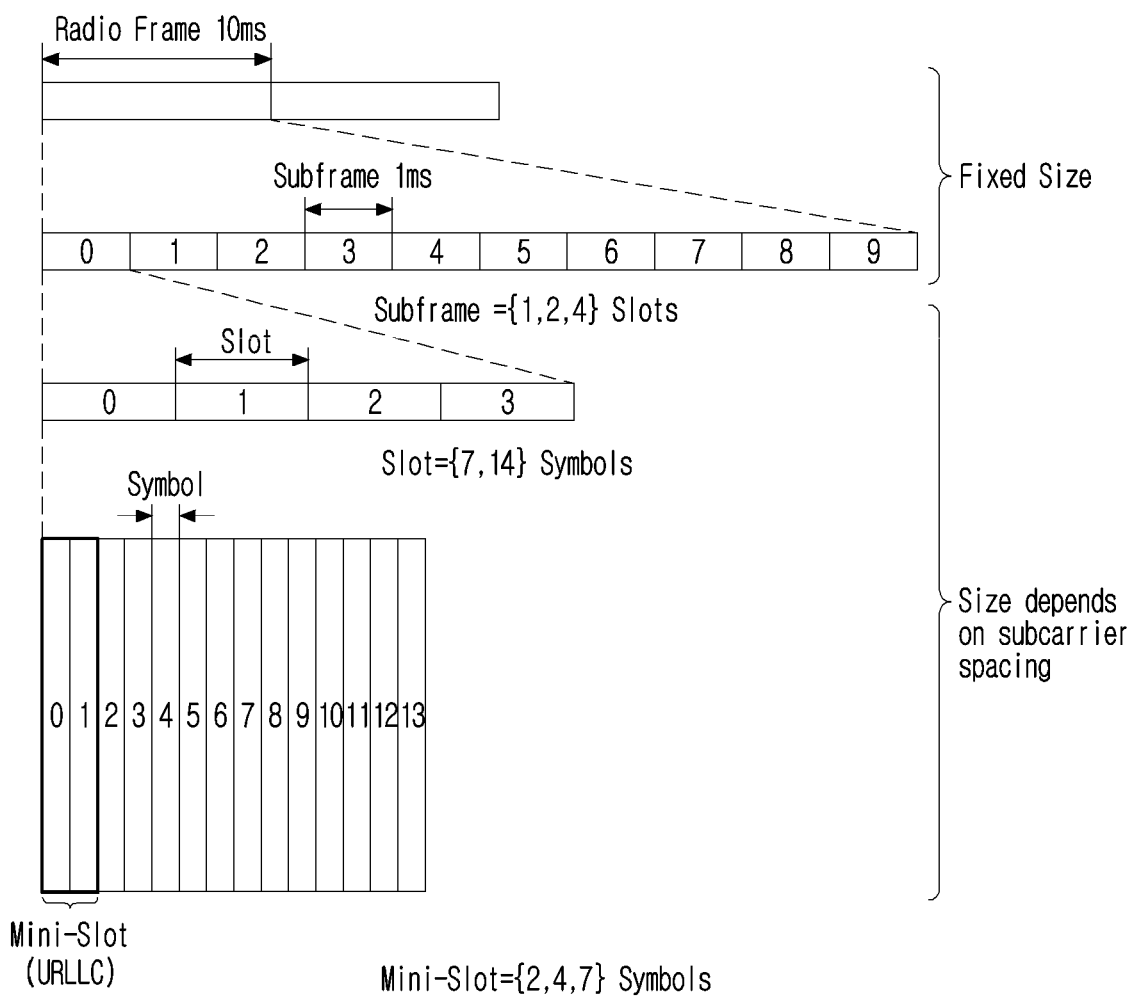
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described.

A plurality of OFDM numerologies supported in a NR system may be defined as in the following Table 1.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration $\mu$, slots are numbered in an increasing order of $n_s^{\mu} \in \{0, \ldots, N_{slot}^{subframe,\mu}-1\}$ in a subframe and are numbered in an increasing order of $n_{s,f}^{\mu} \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu} N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on $\mu=2$ (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
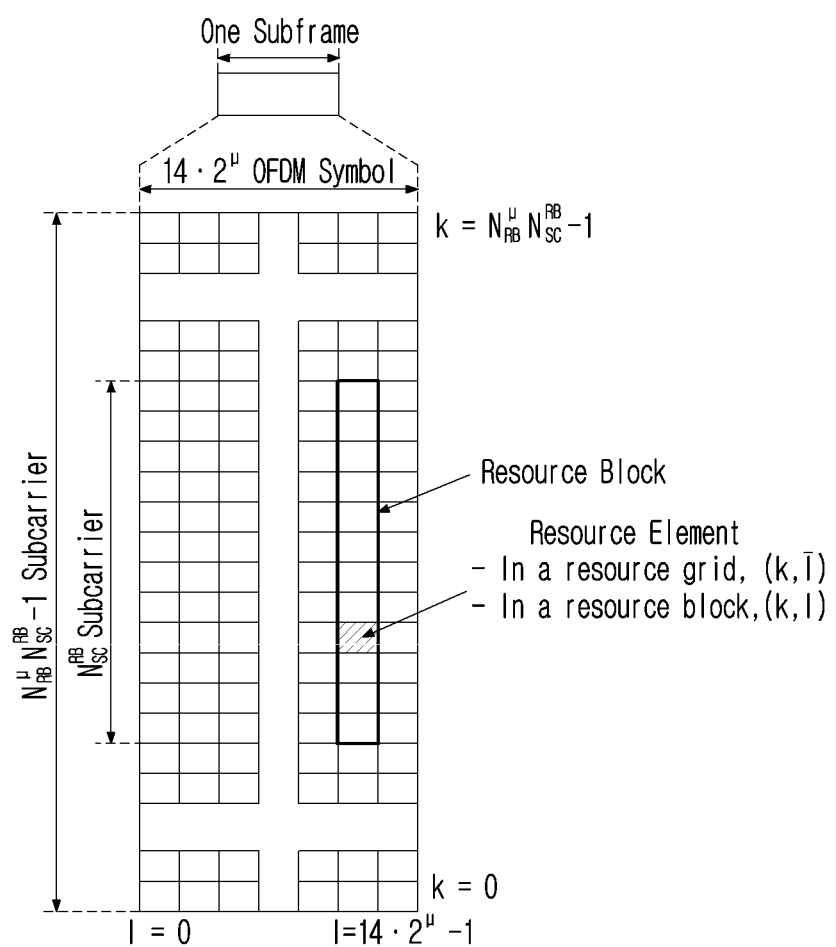
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per $\mu$ and antenna port p. Each element of a resource grid for $\mu$ and an antenna port p is referred to as a resource element and is uniquely identified by an index pair (k,l'). Here, $k=0, \ldots, N_{RB}^{\mu} N_{sc}^{RB}-1$ is an index in a frequency domain and $1'=0, \ldots, 2^{\mu} N_{symb}^{(\mu)}-1$ refers to a position of a symbol in a subframe. When referring to a resource element in a slot, an index pair (k,l) is used. Here, $l=0, \ldots, N_{symb}^{\mu}-1$. A resource element (k,l') for $\mu$ and an antenna port p corresponds to a complex value, $a_{k,l'}^{(p,\mu)}$. When there is no risk of confusion or when a specific antenna port or numerology is not specified, indexes p and $\mu$ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,1) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block TICRB in BWP i is given by the following Equation 2.

$$n_{CRB}^\mu = n_{PRB}^\mu + N_{BWP,i}^{start,\mu} \qquad \text{[Equation 2]}$$

$N_{BWP,i}^{start,\mu}$ is a common resource block that a BWP starts relatively to common resource block 0.

Figure 4:
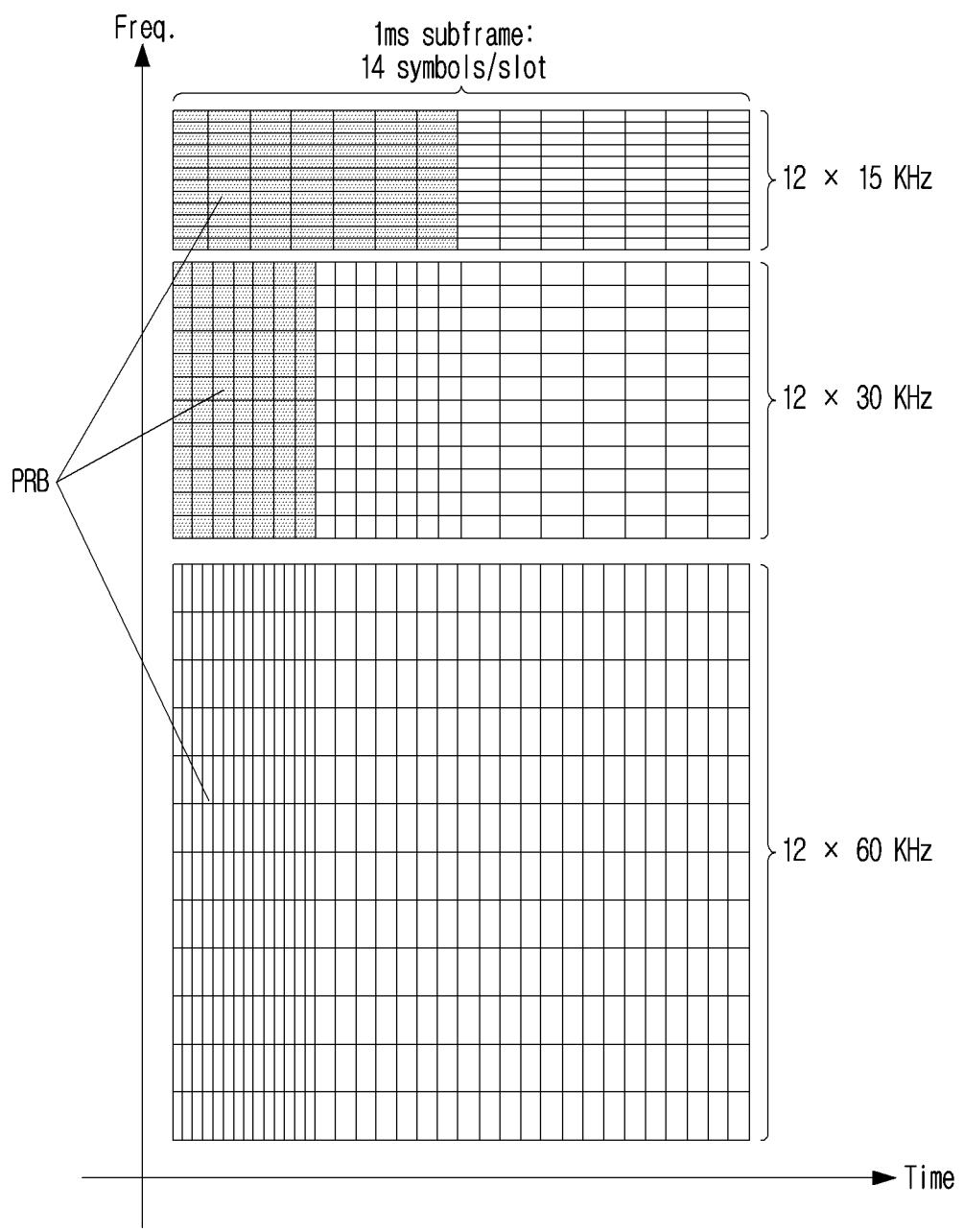
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
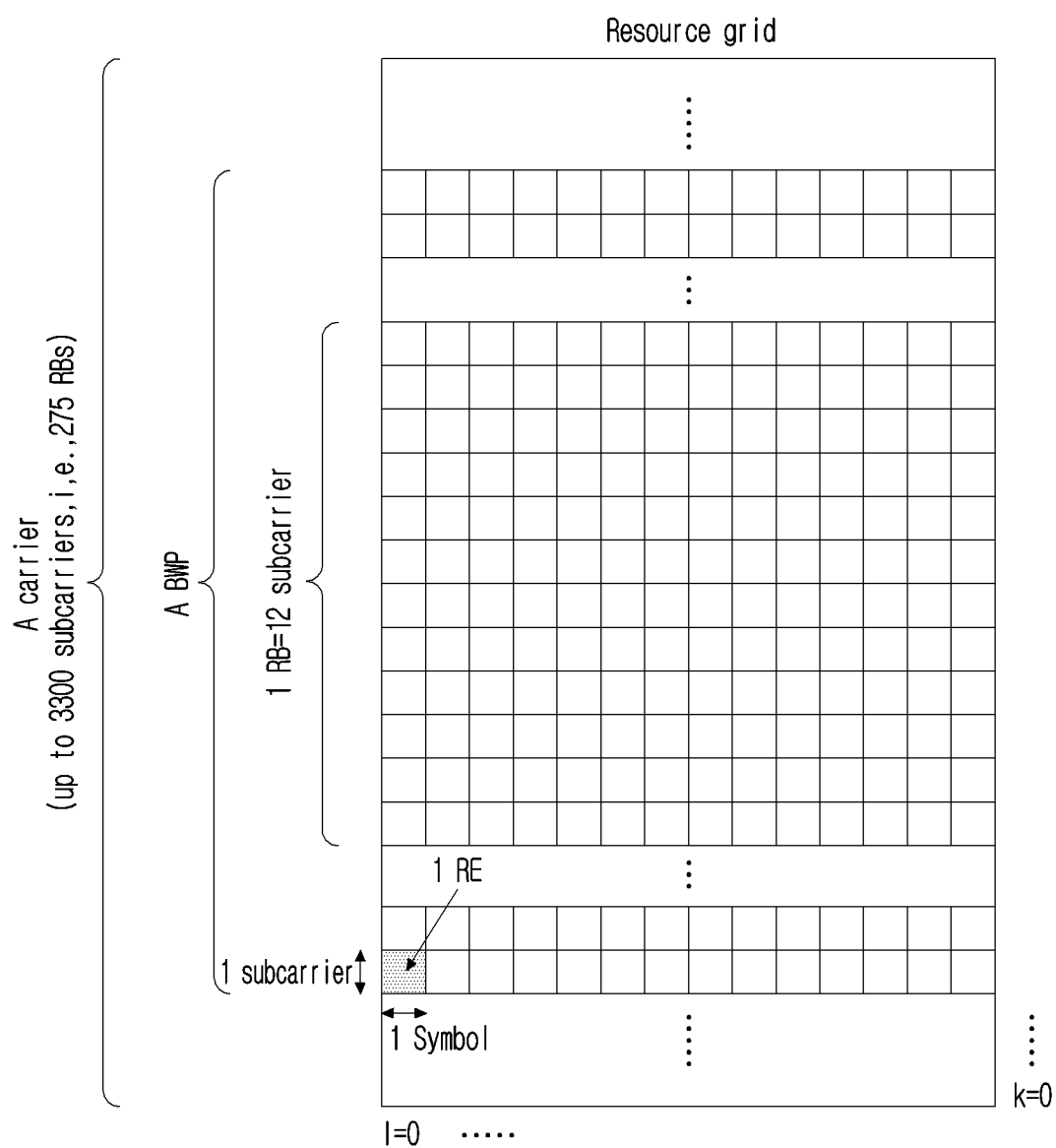
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
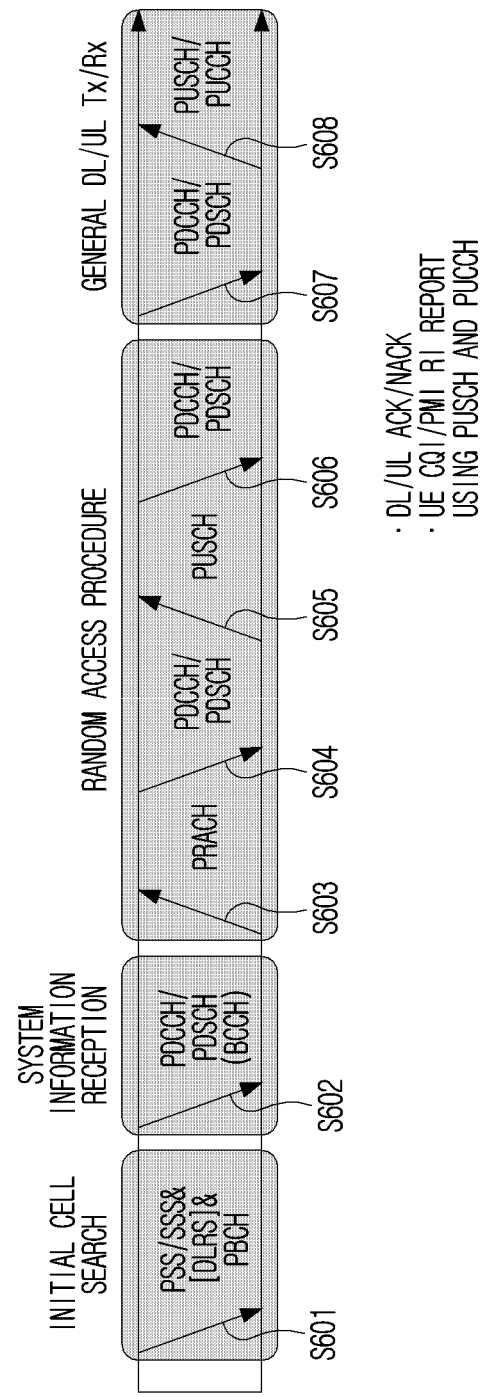
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and 5605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)—PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-co Locaton (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

A UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

Hereinafter, a method for improving reliability in Multi-TRP will be described.

As a transmission and reception method for improving reliability using transmission in a plurality of TRPs, the following two methods may be considered.

Figure 7A:
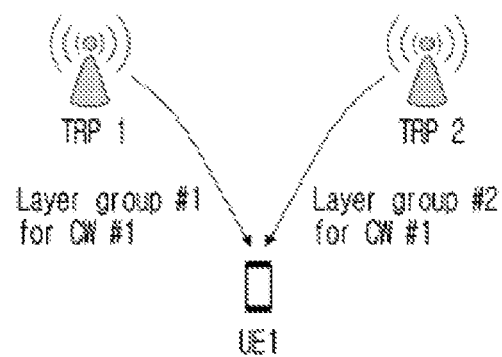
FIGS. 7A and 7B illustrate a method of transmitting multiple TRPs in a wireless communication system to which the present disclosure may be applied.
Figure 7B:
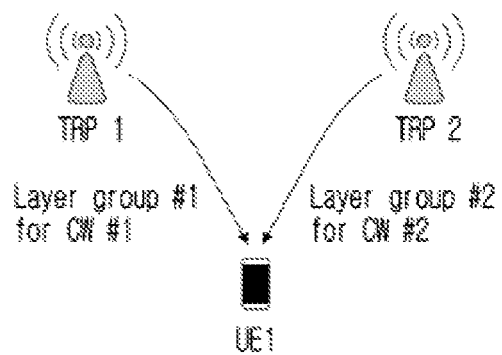

FIGS. 7A and 7B illustrate a method of multiple TRPs transmission in a wireless communication system to which the present disclosure may be applied.

In reference to FIG. 7A, it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7B, an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7B, it may have a disadvantage that a code rate corresponding to a TB is higher compared to FIG. 7A. However, it has an advantage that it may adjust a code rate by indicating a different RV (redundancy version) value or may adjust a modulation order of each CW for encoded bits generated from the same TB according to a channel environment.

According to methods illustrated in FIG. 7A and FIG. 7B above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Multi-TRP scheduled by at least one DCI may be performed as follows:

i) Scheme 1 (SDM): n (n is a natural number) TCI states in a single slot in overlapping time and frequency resource allocation Scheme 1a: Each transmission occasion is one layer or set of layers of the same TB, and each layer or set of layers is associated with one TCI and one set of DMRS port(s). A single codeword with one redundancy version (RV) is used for all layers or sets of layers. For a UE, different coded bits are mapped to different layers or sets of layers with specific mapping rules.

Scheme 1b: Each transmission occasion is one layer or set of layers of the same TB, and each layer or set of layers is associated with one TCI and one set of DMRS port(s). A single codeword with one RV is used for each spatial layer or set of layers. RVs corresponding to each spatial layer or set of layers may be the same or different.

Scheme 1c: Each transmission occasion is one layer of the same TB having one DMRS port associated with multiple TCI state indices or one layer of the same TB with multiple DMRS ports associated with multiple TCI indices in turn (one by one).

In schemes 1a and 1c described above, the same MCS is applied to all layers or sets of layers.

ii) Scheme 2 (FDM): n (n is a natural number) TCI states in a single slot in non-overlapping frequency resource allocation. Each non-overlapping frequency resource allocation is associated with one TCI state. The same single/multiple DMRS port(s) is associated with all non-overlapping frequency resource allocations.

Scheme 2a: A single codeword with one RV is used across an entire resource allocation. For UE, a common RB mapping (mapping of codeword to layer) is applied across all resource allocations.

Scheme 2b: A single codeword with one RV is used for each non-overlapping frequency resource allocation. RVs corresponding to each non-overlapping frequency resource allocation may be the same or different.

In scheme 2a, the same MCS is applied to all non-overlapping frequency resource allocations.

iii) Scheme 3 (TDM): n (n is a natural number) TCI states in a single slot in non-overlapping time resource allocation. Each transmission occasion of a TB has one TCI and one RV with time granularity of a mini-slot. All transmission occasion(s) in a slot use a common MCS with the same single or multiple DMRS port(s). An RV/TCI state may be the same or different among transmission occasions.

iv) Scheme 4 (TDM): n (n is a natural number) TCI states in K (n<=K, K is a natural number) different slots. Each transmission occasion of a TB has one TCI and one RV. All transmission occasion(s) across K slots use a common MCS with the same single or multiple DMRS port(s). An RV/TCI state may be the same or different among transmission occasions.

Control Resource Set (CORESET) and Search Space (SS)

A CORESET may be configured through higher layer signaling (e.g., RRC, etc.). A CORESET information element (IE) ('ControlResourceSet') is used to configure a time/frequency control resource set (CORESET) for searching downlink control information.

Table 6 exemplifies the ControlResourceSet IE.

TABLE 6

```
-- ASN1START
-- TAG-CONTROLRESOURCESET-START
ControlResourceSet ::=                          SEQUENCE {
    controlResourceSetId                            ControlResourceSetId,
    frequencyDomainResources                        BIT STRING (SIZE (45)),
    duration                                        INTEGER (1..maxCoReSetDuration),
    cce-REG-MappingType                             CHOICE {
        interleaved                                     SEQUENCE {
            reg-BundleSize                                  ENUMERATED {n2, n3, n6},
            interleaverSize                                 ENUMERATED {n2, n3, n6},
            shiftIndex
INTEGER(0..maxNrofPhysicalResourceBlocks-1)                 OPTIONAL -- Need S
        },
        nonInterleaved                                  NULL
    },
    precoderGranularity                             ENUMERATED {sameAsREG-bundle,
allContiguousRBs},
    tci-StatesPDCCH-ToAddList                       SEQUENCE(SIZE (1..maxNrofTCI-
StatesPDCCH)) OF TCI-StateId OPTIONAL, -- Cond NotSIB1-initialBWP
    tci-StatesPDCCH-ToReleaseList                   SEQUENCE(SIZE (1..maxNrofTCI-
StatesPDCCH)) OF TCI-StateId OPTIONAL, -- Cond NotSIB1-initialBWP
    tci-PresentInDCI                                ENUMERATED {enabled}
OPTIONAL, -- Need S
    pdcch-DMRS-ScramblingID                         INTEGER (0..65535)
OPTIONAL, -- Need S
    ...,
```

TABLE 6-continued

```
[[
  rb-Offset-r16                          INTEGER (0.5)
OPTIONAL, -- Need N
  tci-PresentInDCI-ForDCI-Format1-2-r16  INTEGER (1..3)
OPTIONAL, -- Need S
  coresetPoolIndex-r16                   INTEGER (0..1)
OPTIONAL, -- Need R
  controlResourceSetId-r16               ControlResourceSetId-r16
OPTIONAL   -- Need S
  ]]
}
-- TAG-CONTROLRESOURCESET-STOP
-- ASN1STOP
```

Table 7 below is a table describing fields in ControlResourceSet IE.

TABLE 7

ControlResourceSet IE field descriptions
cce-REG-MappingType
Mapping of control channel elements (CCE) to resource element groups (REG)
controlResourceSetId
Identifies an instance of the ControlResourceSet IE.
Value 0 identifies a common CORESET (CORESET 0, controlResourceSetZero)
configured in a master information block (MIB) or in a serving cell common configuration
(ServingCellConfigCommon), and is not used in the ControlResourceSet IE. Values from 1
to maxNrofControlResourceSets-1 identify CORESETs configured by dedicated signalling
or in system information block 1 (SIB1). The controlResourceSetId is unique among BWPs
of a serving cell.
coresetPoolIndex
An index of a CORESET pool for the corresponding CORESET.
duration
Contiguous time duration of a CORESET in number of symbols
frequencyDomainResources
Frequency domain resources for a CORESET. Each bit corresponds a group of 6 RBs, with
grouping starting from the first RB group in a BWP. The first (left-most/most significant)
bit corresponds to the first RB group in a BWP, and so on. A bit that is set to 1 indicates that
this RB group belongs to a frequency domain resource of this CORESET. Bits
corresponding to a group of RBs not fully included in a BWP within which a CORESET is
configured are set to 0.
interleaverSize
Interleaver-size
pdcch-DMRS-ScramblingID
PDCCH DMRS scrambling initialization. When this field is absent, a UE applies a value of
the physCellId configured for this serving cell.
precoderGranularity
Precoder granularity in frequency domain
reg-BundleSize
Resource element groups (REGs) may be bundled to generate REG bundles. This parameter
defines a size of such bundles
shiftIndex
When this field is absent, a UE applies a value of the physCellId configured for this serving
cell.
tci-PresentInDCI
This field indicates if a TCI field is present or absent in DCI format 1_i. When this field is
absent, a UE considers a TCI to be absent/disabled. In case of cross carrier scheduling, a
network sets this field to enabled for a CORESET used for cross carrier scheduling in a
scheduling cell.
tci-PresentInDCI-ForDCI-Format1-2
Configures the number of bits for a TCI in DCI format 1_2. When this field is absent, a UE
applies a value of 0 bit for the TCI in DCI format 1_2.
tci-StatesPDCCH-ToAddList
A subset of TCI states defined in a PDSCH configuration (pdsch-Config) included in a
downlink dedicated BWP (BWP-DownlinkDedicated) corresponding to a serving cell and
to a DL BWP to which a CORESET belongs to. They are used for providing QCL
relationships between a DL RS(s) in one RS Set (TCI-State) and PDCCH DMRS ports. A
network configures at most entries of maximum number of PDCCH TCI states
(maxNrofTCI-StatesPDCCH).

A search space (SS) may be configured through higher layer signaling (e.g., RRC). A search space IE ('SearchSpace') defines a method/location for searching for PDCCH candidates. Each search space is associated with one CORESET ('ControlResourceSet'). For a cell scheduled in case of cross-carrier scheduling, all optional fields are absent except for a field for the number of candidates ('nrofCandidates'). Table 8 exemplifies SearchSpace IE.

TABLE 8

```
-- ASN1START
-- TAG-SEARCHSPACE-START
SearchSpace ::=                          SEQUENCE {
  searchSpaceId                            SearchSpaceId,
  controlResourceSetId                     ControlResourceSetId
OPTIONAL,   -- Cond SetupOnly
  monitoringSlotPeriodicityAndOffset       CHOICE {
    sl1                                      NULL,
    sl2                                      INTEGER (0..1),
    sl4                                      INTEGER (0..3),
    sl5                                      INTEGER (0..4),
    sl8                                      INTEGER (0..7),
    sl10                                     INTEGER (0..9),
    sl16                                     INTEGER (0..15),
    sl20                                     INTEGER (0..19),
    sl40                                     INTEGER (0..39),
    sl80                                     INTEGER (0..79),
    sl160                                    INTEGER (0..159),
    sl320                                    INTEGER (0..319),
    sl640                                    INTEGER (0..639),
    sl1280                                   INTEGER (0..1279),
    sl2560                                   INTEGER (0..2559)
  }
OPTIONAL,   -- Cond Setup
  duration                                 INTEGER (2..2559)
OPTIONAL,   -- Need R
  monitoringSymbolsWithinSlot              BIT STRING (SIZE (14))
OPTIONAL,   -- Cond Setup
  nrofCandidates                           SEQUENCE {
    aggregationLevel1                        ENUMERATED {n0, n1, n2, n3, n4, n5, n6, n8},
    aggregationLevel2                        ENUMERATED {n0, n1, n2, n3, n4, n5, n6, n8},
    aggregationLevel4                        ENUMERATED {n0, n1, n2, n3, n4, n5, n6, n8},
    aggregationLevel8                        ENUMERATED {n0, n1, n2, n3, n4, n5, n6, n8},
    aggregationLevel16                       ENUMERATED {n0, n1, n2, n3, n4, n5, n6, n8}
  }
OPTIONAL,   -- Cond Setup
  searchSpaceType                          CHOICE {
    common                                   SEQUENCE {
      dci-Format0-0-AndFormat1-0               SEQUENCE {
        ...
      }
OPTIONAL,   -- Need R
      dci-Format2-0                            SEQUENCE {
        nrofCandidates-SFI                       SEQUENCE {
          aggregationLevel1                        ENUMERATED
{n1, n2}                                 OPTIONAL,   -- Need R
          aggregationLevel2                        ENUMERATED
{n1, n2}                                 OPTIONAL,   -- Need R
          aggregationLevel4                        ENUMERATED
{n1, n2}                                 OPTIONAL,   -- Need R
          aggregationLevel8                        ENUMERATED
{n1, n2}                                 OPTIONAL,   -- Need R
          aggregationLevel16                       ENUMERATED
{n1, n2}                                 OPTIONAL    -- Need R
        },
        ...
      }
OPTIONAL,   -- Need R
      dci-Format2-1                            SEQUENCE {
        ...
      }
OPTIONAL,   -- Need R
      dci-Format2-2                            SEQUENCE {
        ...
      }
OPTIONAL,   -- Need R
      dci-Format2-3                            SEQUENCE {
        dummy1                                   ENUMERATED
```

TABLE 8-continued

```
{sl1, sl2, sl4, sl5, sl8, sl10, sl16, sl20}      OPTIONAL,   -- Cond Setup
        dummy2                                   ENUMERATED
{n1, n2},
        ...
      }
OPTIONAL     -- Need R
    },
    ue-Specific                                  SEQUENCE {
      dci-Formats                                ENUMERATED
{formats0-0-And-1-0, formats0-1-And-1-1},
      ...,
      [[
      dci-FormatsSL-r16                          ENUMERATED {formats0-0-
And-1-0, formats0-1-And-1-1, formats3-0, formats3-1,
                                                        formats3-0-
And-3-1}          OPTIONAL,      -- Need R
      dci-FormatsExt-r16                         ENUMERATED {formats0-1-
And-1-1, formats0-2-And-1-2, formats0-1-And-1-1And-0-2-And-1-2}
OPTIONAL,   -- Need N
      searchSpaceGroupIdList-r16                 SEQUENCE (SIZE (1.. 2)) OF
INTEGER (0 .1)                                   OPTIONAL,   -- Need R
      freqMonitorLocations-r16                   BIT STRING (SIZE (5))
OPTIONAL    -- Need R
      ]]
    }
  }
OPTIONAL     -- Cond Setup2
}
SearchSpace-v16xy ::=                            SEQUENCE {
  searchSpaceId                                    SearchSpaceId,
  controlResourceSetId-r16                         ControlResourceSetId-r16
OPTIONAL,    -- Cond SetupOnly
  searchSpaceType-r16                            CHOICE {
    common-r16                                     SEQUENCE {
      dci-Format2-4-r16                            SEQUENCE {
        nrofCandidates-CI-r16                        SEQUENCE {
          aggregationLevel1                            ENUMERATED
{n1, n2}                                         OPTIONAL,   -- Need R
          aggregationLevel2                          ENUMERATED
{n1, n2}                                         OPTIONAL,   -- Need R
          aggregationLevel4                          ENUMERATED
{n1, n2}                                         OPTIONAL,   -- Need R
          aggregationLevel8                          ENUMERATED
{n1, n2}                                         OPTIONAL,   -- Need R
          aggregationLevel16                         ENUMERATED
{n1, n2}                                         OPTIONAL    -- Need R
        },
        ...
      },
      dci-Format2-5-v16xy                          SEQUENCE {
        nrofCandidates-IAB-r16                       SEQUENCE {
          aggregationLevel1-r16                      ENUMERATED
{n1, n2}                                         OPTIONAL,   -- Need R
          aggregationLevel2-r16                      ENUMERATED
{n1, n2}                                         OPTIONAL,   -- Need R
          aggregationLevel4-r16                      ENUMERATED
{n1, n2}                                         OPTIONAL,   -- Need R
          aggregationLevel8-r16                      ENUMERATED
{n1, n2}                                         OPTIONAL,   -- Need R
          aggregationLevel16-r16                     ENUMERATED
{n1, n2}                                         OPTIONAL    -- Need R
        },
        ...
      },
      dci-Format2-6-r16                            SEQUENCE {
        ...
      }
OPTIONAL,    -- Need R
      ...
    },
    mt-Specific-v16xy                            SEQUENCE {
      dci-Formats-r16                              ENUMERATED
{formats2-0-And-2-5},
      ...
    }
  }
```

TABLE 8-continued

```
OPTIONAL    -- Cond Setup2
}
-- TAG-SEARCHSPACE-STOP
-- ASN1STOP
```

Table 9 below is a table describing fields in SearchSpace IE.

TABLE 9

SearchSpace IE field decsriptions
common
Configures this search space as common search space (CSS) and DCI formats to monitor.
controlResourceSetId
A CORESET applicable for this search space. Value 0 identifies the common CORESET#0
configured in MIB and in a servind cell common configuration
(ServingCellConfigCommon). Values from 1 to maxNrofControlResourceSets-1 identify
CORESETs configured in system information or by dedicated signalling. CORESETs with
non-zero CORESET ID (controlResourceSetId) are configured in the same BWP as this
search space.
dci-Format0-0-AndFormat1-0
If configured, a UE monitors DCI formats 0_0 and 1_0.
dci-Format2-0
If configured, a UE monitors DCI format 2_0.
dci-Format2-1
If configured, a UE monitors DCI format 2_1.
dci-Format2-2
If configured, a UE monitors DCI format 2_2.
dci-Format2-3
If configured, a UE monitors DCI format 2_3.
dci-Format2-4
If configured, a UE monitors DCI format 2_4. The maximum monitoring periodicity for
DCI format 2_4 is 5 slots.
dci-Format2-5
If configured, a integrated access and backhaul mobile terminal (IAB-MT) monitors the
DCI format 2_5.
dci-Format2-6
If configured, a UE monitors DCI format 2_6. DCI format 2_6 can only be configured on a
special cell (SpCell).
dci-Formats
Indicates whether a UE monitors in this UE-specific search space (USS) for DCI formats 0-
0 and 1-0 or for formats 0-1 and 1-1
dci-FormatsExt
If this field is present, the field 'dci-Formats' is ignored and 'dci-FormatsExt' is used
instead to indicate whether a UE monitors in this USS for DCI formats 0_1 and 1_1 or
format 0_2 and 1_2 or formats 0_1 and 1_1 and 0_2 and 1_2.
dci-FormatsSL
Indicates whether a UE monitors in this UE-specific search space (USS) for DCI formats 0-
0 and 1-0 or for formats 0-1 and 1-1 or for format 3-0 of dynamic grant or for format 3-1 or
for formats 3-0 of dynamic grant and 3-1.
duration
Number of consecutive slots that a SearchSpace lasts in every occasion (upon every period
as given in the periodicityAndOffset). If this field is absent, a UE applies the value 1 slot,
except for DCI format 2_0. A UE ignores this field for DCI format 2_0. The maximum
valid duration is periodicity-1 (here, periodicity as given in the
monitoringSlotPeriodicityAndOffset).
For an IAB-MT, duration indicates the number of consecutive slots that a SearchSpace lasts
in every occasion (upon every period as given in the periodicityAndOffset). If this field is
absent, an IAB-MT applies the value 1 slot, except for DCI format 2_0 and DCI format
2_5. A UE ignores this field for DCI format 2_0 and DCI format 2_5. The maximum valid
duration is periodicity-1 (here, periodicity as given in the
monitoringSlotPeriodicityAndOffset).
freqMonitorLocations
Defines an association of a search space for multiple monitoring positions in a frequency
domain, and indicates whether a pattern configured in the associated CORESET is
replicated to a specific RB set. Each bit in a bitmap corresponds to one set of RBs, LSB
corresponds to RB set 0 in a BWP. A bit set to 1 indicates that frequency domain resource
allocation replicated from the pattern configured in the related CORESET is mapped to an
RB set.
monitoringSlotPeriodicityAndOffset
Slots for PDCCH monitoring configured as periodicity and offset. If a UE is configured to
monitor DCI format 2_1, only the values 'sl1', 'sl2' or 'sl4' are applicable. If a UE is
configured to monitor DCI format 2_0, only the
values 'sl1', 'sl2', 'sl4', 'sl5', 'sl8', 'sl10', 'sl16', and 'sl20' are applicable.

TABLE 9-continued

For an IAB-MT, If an IAB-MT is configured to monitor DCI format 2_1, only the values
'sl1', 'sl2' or 'sl4' are applicable. If an IAB-MT is configured to monitor DCI format 2_0 or
DCI format 2_5, only the values 'slr', 'sl2', 'sl4', 'sl5', 'sl8', 'sl10', 'sl16', and 'sl20' are
applicable.
monitoringSymbolsWithinSlot
The first symbol(s) for PDCCH monitoring in slots configured for PDCCH monitoring (by
monitoringSlotPeriodicityAndOffset and duration). The most significant (left) bit represents
the first OFDM in a slot, and the second most significant (left) bit represents the second
OFDM symbol in a slot and so on. The bit(s) set to 1 identify the first OFDM symbol(s) of
a CORESET within a slot. If a cyclic prefix of a BWP is configured to extended CP, the last
two bits within a bit string shall be ignored by a UE.
nrofCandidates-CI
The number of PDCCH candidates for format 2-4 for the configured aggregation level. If
an aggregation level is absent, a UE does not search for any candidates with the
corresponding aggregation level. A network configures only one aggregationLevel and the
corresponding number of candidates.
nrofCandidates-SFI
The number of PDCCH candidates for format 2-0 for the configured aggregation level. If
an aggregation level is absent, a UE does not search for any candidates with the
corresponding aggregation level. A network configures only one aggregationLevel and the
corresponding number of candidates.
nrofCandidates
Number of PDCCH candidates per aggregation level. The number of candidates and
aggregation levels configured here applies to all formats unless a particular value is
specified or a format-specific value is provided. If configured in the SearchSpace of a cross
carrier scheduled cell, this field determines the number of candidates and aggregation levels
to be used on the linked scheduling cell.
searchSpaceGroupIdList
List of search space group identities (IDs) which a search space set is associated with.
searchSpaceId
Identity of a search space. SearchSpaceId = 0 identifies the searchSpaceZero configured via
PBCH (MIB) or ServingCellConfigCommon and may hence not be used in the
SearchSpace IE. The searchSpaceId is unique among BWPs of a Serving Cell. In case of
cross carrier scheduling, search spaces with the same searchSpaceId in scheduled cell and
scheduling cell are linked to each other. A UE applies a search space for the scheduled cell
only if DL BWPs in which the linked search spaces are configured in scheduling cell and
scheduled cell are both active.
For an IAB-MT, a search space defines how/where to search for PDCCH candidates for an
IAB-MT. Each search space is associated with one ControlResearchSet. For a scheduled
cell in the case of cross carrier scheduling, except for nrofCandidates, all the optional fields
are absent.
searchSpaceType
Indicates whether this search space is a common search space or a UE-specific search space
as well as DCI formats to monitor for.
ue-Specific
Configures this search space as a USS. A UE monitors a DCI format with CRC scrambled
by C-RNTI, CS-RNTI (if configured), and SP-CSI-RNTI (if configured)
mt-Specific-v16xy
Configure this search space as an IAB-MT specific search space (MSS).

The above descriptions may be used to apply/configure the methods proposed in the present disclosure.

M-TRP PDCCH Transmission Method

Hereinafter, in the present disclosure, DL MTRP-URLLC means that M-TRPs transmit the same data (e.g., transport block, TB)/DCI by using a different layer/time/frequency resource. For example, TRP 1 transmits the same data/DCI in resource 1 and TRP 2 transmits the same data/DCI in resource 2. UE configured with a DL MTRP-URLLC transmission method receives the same data/DCI by using a different layer/time/frequency resource. Here, UE is indicated which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. UE may achieve high reliability because it receives the same data/DCI through resource 1 and resource 2. Such DL MTRP URLLC may be applied to a PDSCH/a PDCCH.

Conversely, UL MTRP-URLLC means that M-TRPs receive the same data/UCI from UE by using a different layer/time/frequency resource. For example, TRP 1 receives the same data/UCI from UE in resource 1 and TRP 2 receives the same data/UCI from UE in resource 2 and shares received data/UCI through a backhaul link connected between TRPs. UE configured with a UL MTRP-URLLC transmission method transmits the same data/UCI by using a different layer/time/frequency resource. Here, UE is indicated which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in methods proposed in the present disclosure, when a specific TCI state (or a TCI) is used (/mapped) in receiving data/DCI/UCI for any frequency/time/space resource, it may mean that a DL estimates a channel from a DMRS by using a QCL type and a QCL RS indicated by a corresponding TCI state in that frequency/time/space resource and receives/demodulates data/DCI to an estimated channel. It may mean that an UL transmits/modulates a DMRS and data/UCI by using a Tx beam and/or Tw power indicated by a corresponding TCI state in that frequency/time/space resource.

The UL TCI state has Tx beam and/or Tx power information of UE and spatial relation information, etc. instead of a TCI state may be configured to UE through other parameter. An UL TCI state may be directly indicated to UL grant DCI or may mean spatial relation information of an SRS resource indicated by an SRI (SRS resource indicator) field of UL grant DCI. Alternatively, it may mean an OL (open loop) Tx power control parameter connected to a value indicated by a SRI field of UL grant DCI (j: an index for open loop parameter Po and alpha($\alpha$) (up to 32 parameter value sets per cell), q_d: an index of a DL RS resource for PL (pathloss) measurement (measurement of up to 3 per cell), 1: a closed loop power control process index (up to 2 processes per cell)).

On the other hand, it is assumed that MTRP-eMBB means that M-TRPs transmit other data by using a different layer/time/frequency, UE configured with a MTRP-eMBB transmission method is indicated multiple TCI states with DCI and data received by using a QCL RS of each TCI state is different data.

In addition, whether of MTRP URLLC transmission/reception or MTRP eMBB transmission/reception may be understood by UE by separately classifying a RNTI for MTRP-URLLC and a RNTI for MTRP-eMBB and using them. In other words, when CRC masking of DCI is performed by using a RNTI for URLLC, it is considered as URLLC transmission and when CRC masking of DCI is performed by using a RNTI for eMBB, it is considered as eMBB transmission. Alternatively, a base station may configure MTRP URLLC transmission/reception or may configure MTRP eMBB transmission/reception to UE through other new signaling.

In the present disclosure, for convenience of a description, a proposal is applied by assuming cooperative transmission/reception between 2 TRPs, but it may be extended and applied in 3 or more multi-TRP environments and it may be also extended and applied in multi-panel environments. A different TRP may be recognized by UE as a different transmission configuration indication (TCI) state. That is, when UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (the same PDCCH is repetitively or partitively transmitted) and some proposals may be utilized even in a situation where MTRP cooperatively transmits a PDSCH or cooperatively receives a PUSCH/a PUCCH.

In addition, in the present disclosure below, when a plurality of base stations (i.e., MTRP) repetitively transmit the same PDCCH, it may mean the same DCI is transmitted by a plurality of PDCCH candidates and it means that a plurality of base stations repetitively transmit the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N(ACK/NACK) based on a reception time of DCI. Here, if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure below, when a plurality of base stations (i.e., MTRP) divide and transmit the same PDCCH, it may mean that one DCI is transmitted through one PDCCH candidate, but TRP 1 transmits some resources in which the PDCCH candidate is defined and TRP 2 transmits the remaining resources. For example, when TRP 1 and TRP 2 divide and transmit a PDCCH candidate corresponding to an aggregation level m1+m2, the PDCCH candidate is divided into PDCCH candidate 1 corresponding to aggregation level m1 and PDCCH candidate 2 corresponding to aggregation level m2, and TRP 1 transmits the PDCCH candidate 1 and TRP 2 transmits the PDCCH candidate 2 using different time/frequency resources. After receiving the PDCCH candidate 1 and the PDCCH candidate 2, a UE generates a PDCCH candidate corresponding to aggregation level m1+m2 and attempts DCI decoding.

In summary, it may be as follows that a plurality of base stations (i.e., MTRP) divide/repeat the same PDCCH and transmit over a plurality of monitoring occasions (MO).

i) it may mean that each base station (i.e., STRP) repeatedly transmits coded DCI bits obtained by encoding all DCI contents of a corresponding PDCCH through each MO; or,
  ii) it may mean that coded DCI bits obtained by encoding all DCI contents of a corresponding PDCCH are divided into a plurality of parts, and each base station (i.e., STRP) transmits a different part through each MO; or
  iii) it may mean that DCI contents of a corresponding PDCCH are divided into a plurality of parts, and each base station (i.e., STRP) separately encodes different parts and transmits them through each MO.

That is, it may be understood that a PDCCH is transmitted multiple times over several transmission occasions (TO) regardless of repeated transmission or divided transmission of the PDCCH. Here, a TO means a specific time/frequency resource unit in which a PDCCH is transmitted. For example, if a PDCCH is transmitted multiple times (in a specific resource block (RB)) over slots 1, 2, 3, and 4, a TO may mean each slot, or if a PDCCH is transmitted multiple times (in a specific slot) over RB sets 1, 2, 3, and 4, a TO may mean each RB set, or if a PDCCH is transmitted multiple times over different times and frequencies, a TO may mean each time/frequency resource. In addition, a TCI state used for DMRS channel estimation for each TO may be configured differently, and it may be assumed that TOs in which a TCI state is configured differently are transmitted by different TRPs/panels. When a plurality of base stations repeatedly transmits or dividedly transmits a PDCCH, it means that the PDCCH is transmitted over a plurality of TOs, and the union of TCI states configured in corresponding TOs is configured with two or more TCI states. For example, if a PDCCH is transmitted over TOs 1,2,3,4, TCI states 1,2,3,4 may be configured in each of TOs 1,2,3,4, respectively, which means that TRP i transmits cooperatively a PDCCH in TO i.

For a plurality of TOs indicated to a UE to repeatedly transmit or dividedly transmit a PDCCH/PDSCH/PUSCH/PUCCH, UL transmits to a specific TRP or DL receives from a specific TRP in each TO. Here, a UL TO (or TO of TRP 1) transmitted to TRP 1 means a TO using the first value among two spatial relations, two UL TCIs, two UL power control parameters and/or two pathloss reference signals (PLRS) indicated to a UE, and a UL TO (or TO of TRP 2) transmitted to TRP 2 means a TO using the second value among two spatial relations, two UL TCIs, two UL power control parameters and/or two PLRSs indicated to a UE. Similarly, for DL transmission, a DL TO (or TO of TRP 1) transmitted by TRP 1 means a TO using the first value among two DL TCI states (e.g., when two TCI states are configured in CORESET) indicated to a UE, and a DL TO (or TO of TRP 2) transmitted by TRP 2 means a TO using the second value among two DL TCI states (e.g., when two TCI states are configured in CORESET) indicated to a UE.

The proposal of the present disclosure can be extended and applied to various channels such as PUSCH/PUCCH/PDSCH/PDCCH.

The proposal of the present disclosure can be extended and applied to both a case of repeated transmission and a case of divided transmission the channel on different time/frequency/spatial resources.

In NR, in order to provide flexibility for a PDCCH control region, it is not required to configure the PDCCH control region over the system bandwidth. Accordingly, a time/frequency control resource set (CORESET) for searching for downlink control information (DCI) (or for monitoring a PDCCH) may be configured. A CORESET may be divided into a common CORESET and a UE-specific CORESET. A common CORESET may be configured for multiple UEs in one cell, and a UE-specific CORESET may mean a PDCCH control region defined for a specific UE.

For each CORESET, information such as a CORESET index, the number of consecutive symbols that are resource regions in a time domain of a CORESET, a set of resource blocks (RBs) that are resource regions in a frequency domain of a CORESET, an antenna port QCL indicating QCL information of a DM-RS antenna port for PDCCH reception in a corresponding CORESET from a set of antenna port QCLs provided by a TCI state may be provided to a UE by higher layer signaling (e.g., ControlResourceSet).

A set of PDCCH candidates that a UE monitors is defined as PDCCH search space sets. A search space set may be divided into a common search space set (CSS) and a UE-specific search space set (USS).

Each search space (set) may be associated with one CORESET, and one CORESET may be associated with multiple search space sets.

A UE monitors PDCCH candidates in one or more search space sets. That is, a UE monitors a set of PDCCH candidates in one or more CORESETs (i.e., CORESET(s) associated with each configured search space set) on an activated DL BWP on each activated serving cell in which PDCCH monitoring is configured according to search space sets. Here, monitoring includes decoding each PDCCH candidate according to monitored DCI formats.

For each BWP configured to a UE in a serving cell, one or more search space sets may be configured by higher layer signaling to the UE, and for each search space set, information such as a search space index ('searchSpaceId'), association between a corresponding search space set and a CORESET ('controlResourceSetId'), a PDCCH monitoring period and a PDCCH monitoring offset in units of slots ('monitoringSlotPeriodicityAndOffset'), a in-slot PDCCH monitoring pattern indicating the first symbol(s) of a CORESET in a slot for PDCCH monitoring ('monitoringSymbolsWithinSlof') (i.e., a bit string indicates a position of each start symbol(s) where a CORESET starts), the number of slots in which a corresponding search space set exists ('duration') may be provided to a UE by higher layer signaling (e.g., SearchSpace).

A UE determines a PDCCH monitoring occasion (MO) on an activated BWP from a PDCCH monitoring period, a PDCCH monitoring offset and a PDCCH monitoring pattern in a slot. That is, based on a search space set configuration and a CORESET configuration, a UE determines a start symbol(s) of a CORESET associated with a corresponding search space set in one or more slots (consecutive slots in a case of a plurality of slots), and determines how many slot periods this pattern repeats.

Hereinafter, each PDCCH search space(s) included in a search space set in the present disclosure has the same meaning as the above-described PDCCH monitoring occasion (MO). That is, in the present disclosure, a search space may be interpreted/substituted as a monitoring occasion (MO).

Hereinafter, the present disclosure proposes various methods to support smooth and efficient MTRP PDCCH transmission (transmitting the same DCI or transmitting one DCI by dividing in MTRP).

For MTRP PDCCH transmission, a base station may configure a CORESET and a search space set (SS set) to a UE, for example, under the assumption that two TRPs are cooperatively transmitted, the following alternatives are considered.

i) Two CORESETs and Two SS Sets

In each CORESET, a TCI state corresponding to each TRP may be configured, and each SS set may be mapped 1:1 with a CORESET. As a result, TRP 1 may transmit a PDCCH using CORESET 1 and SS set 1, and TRP 2 may transmit a PDCCH using CORESET 2 and SS set 2. A UE may perform DCI decoding by recognizing that a PDCCH candidate of SS set 1 and a PDCCH candidate of SS set 2 are used for repeated/divided transmission of DCI.

ii) One CORESET and One SS Set

A plurality of TCI states corresponding to each TRP are configured in a CORESET, and each SS set may be mapped 1:1 with a CORESET. As a result, TRP 1 may transmit a PDCCH using TCI state 1 of CORESET 1 and SS set 1, and TRP 2 may transmit a PDCCH using TCI state 2 of CORESET 1 and SS set 1. A UE may perform DCI decoding by recognizing that a PDCCH candidate(s) of SS set 1 is used for repeated/divided/single frequency network (SFN) transmission of DCI.

iii) Two CORESETs and One SS Set

In each CORESET, a TCI state corresponding to each TRP is configured, and each SS set may be mapped to both CORESETs. As a result, TRP 1 may transmit a PDCCH using CORESET 1 and SS set 1, and TRP 2 may transmit a PDCCH using CORESET 2 and SS set 1. A UE may perform DCI decoding by recognizing that a PDCCH candidate(s) of SS set 1 is used for repeated/divided/SFN transmission of DCI.

iv) One CORESET and Two SS Sets

A plurality of TCI states corresponding to each TRP are configured in a CORESET, and two SS sets may be mapped to the same CORESET. As a result, TRP 1 may transmit a PDCCH using TCI state 1 of CORESET 1 and SS set 1, and TRP 2 may transmit a PDCCH using TCI state 2 of CORESET 1 and SS set 2. A UE may perform DCI decoding by recognizing that a PDCCH candidate of SS set 1 and a PDCCH candidate of SS set 2 are used for repeated/divided transmission of DCI.

Embodiment 1: a DCI Format/Common SS (CSS)/User-Specific SS (USS)/RNTI/PDCCH Type to which Repeated or SFN Transmission of a PDCCH is Applied May be Configured (Restricted)

It may be configured to a UE that the same PDCCH is repeatedly/dividedly transmitted only for some DCI format/SS type/RNTI defined in the SS set for one or more SS sets configured for MTRP PDCCH transmission, and for the rest, a PDCCH is transmitted from one TRP according to the conventional method. For example, for an SS set in which both DCI formats 1-0 and 1-1 are defined, it may be configured that the same PDCCH is repeatedly/dividedly transmitted only for format 1-0 (or 1-1). Alternatively, it may be configured that the same PDCCH is repeatedly/dividedly transmitted only for a CSS (or USS) among a USS and a CSS. Alternatively, the same PDCCH may be repeatedly/dividedly transmitted only for DCI that is CRC masked (or scrambled) with a specific RNTI (e.g., RNTIs other than Cell RNTI (C-RNTI), Modulation Coding Scheme Cell RNTI (MCS-C-RNTI), Configured Scheduling RNTI (CS-RNTI)).

A DCI format for blind decoding in each SS for two search spaces (SSs) configured to repeatedly or dividedly transmit the same PDCCH may be configured independently. For example, DCI format 1-0/1-1 may be configured in SS 0 and DCI format 1-2/1-1 may be configured in SS 1. In this case, multiple TRP repeatedly or dividedly transmit the same PDCCH only for a common DCI format of two SSs (DCI format 1-1 in the above example), and one TRP may transmit for other DCI formats.

In order for two TRPs to transmit the same PDCCH, a QCL RS of a PDCCH DMRS transmitted by each TRP should be different, and as a result, a TCI state to be used for PDCCH decoding needs to be different. In the existing standard method, one TCI state is defined per CORESET, however for MTRP PDCCH transmission, two CORESETs corresponding to TCI states of two TRPs may be configured, or one CORESET is configured but two TCI states may be configured in the CORESET. According to the standard, CORESET 0 is a special CORESET used to transmit system information to a UE, unlike general CORESETs. Here, when two CORESET 0s are configured for MTRP PDCCH transmission, operations of other UEs based on CORESET 0 may be ambiguous. Therefore, in case of CORESET 0, up to two TCI states may be configured to support MTRP PDCCH transmission. In addition, for the remaining CORESETs, one TCI state per CORESET is configured, but MTRP PDCCH transmission may be supported using multiple CORESETs. Alternatively, if one TCI state is still configured in CORESET 0, and another CORESET (e.g., CORESET x) has the same configurations as CORESET 0 except for a TCI state and a CORESET ID, a UE may use CORESET x for configuring an additional TCI state in CORESET 0.

When multiple TCIs are configured in a CORESET and/or when CORESET/SSs with different TCIs are configured for MTRP PDCCH transmission, a base station may separately indicate/configure a type of SS (e.g., only USS/only some RNTIs among USS+CSS/USS+CSS/only CSS) or DCI format to which the MTRP PDCCH is to be applied.

In case of a CSS, various types of information may be transmitted in detail. For example, system information transmitted with a SI-RNTI, paging, or a PDCCH transmitted with a random access-RNTI (RA-RNTI) and a temporary cell-RNTI (t-C-RNTI) upon initial access may be transmitted. Since a PDCCH related to an initial access is prior to an RRC connection, it is preferably transmitted from a specific TRP that transmits an SSB to which a UE has attempted to access. Since paging and system information (SI) have properties of being broadcast, it can be understood that they are transmitted through multiple beams/TRPs in the current standard. For example, several TRPs may be transmitting the same paging information to a UE in an idle state, respectively, and the UE may wake up by receiving one of the pagings. (this is because different TRPs repeatedly transmit the same DCI, and when a UE succeeds in receiving at least one of a plurality of DCIs by determining each DCI as an individual DCI, since the corresponding control information can be received, reliability is increased.) (for reference, a PBCH in an SSB also needs to be redesigned for MTRP transmission for an SI-PDCCH.) Considering this, MTRP transmission is not supported for CORESET 0, or MTRP transmission may be limited and applied only to a USS. To this end, when a plurality of TCIs are configured/applied to a CORESET, only a specific TCI (e.g., the first TCI, the TCI state with the lowest/highest ID, or the first (top of a list) TCI state among TCI states configured in a CORESET) among them may be applied to a CSS, and both TCIs may be applied to a USS. Alternatively, when a plurality of TCIs are configured/applied to a CORESET, if the CORESET is used in association with a CSS, only a specific TCI among the plurality of TCIs is applied, and both TCIs may be applied to a USS. Alternatively, when a plurality of TCIs are configured/applied to a CORESET, if the CORESET is used in association with DCI format x-0 (e.g., 1-0 or 0-0), only a specific TCI among the plurality of TCIs is applied, or if the CORESET is used in association with DCI format x-1 or x-2 (e.g., 1-1 or 0-1), both TCIs may be applied. As described above, a UE may attempt PDCCH DMRS decoding by applying one or more TCIs.

Embodiment 2: when a CORESET in which Two TCI States are Configured is Updated to an Random Access Channel (RACH) SSB, the Following Method May be Applied First, a method for TCI state activation of a CORESET in Rel-16 NR is as follows.
- In case of a CORESET other than a CORESET having an index of 0, a TCI state of the CORESET may be indicated by RRC signaling or by a MAC control element (CE) activation command (selected from among TCI states configured by RRC). If there is no indication, a UE assumes that a DM-RS associated with PDCCH reception is quasi co-located (QCL) with an SSB identified during an initial access procedure.
- In case of a CORESET with an index of 0, a TCI state of the CORESET is indicated by i) a MAC CE activation command and by ii) the most recent among SSBs identified the most recent random access procedure.
- In case of a CORESET with an index of 0, a UE expects that a QCL-TypeD of a CSI-RS in a TCI state indicated by a MAC CE activation command for a CORESET is provided by an SSB.

In order to support MTRP PDCCH transmission, two TCI states should be activated in CORESET 0 by a MAC CE. However, if an SSB is identified by a RACH procedure, a QCL RS of CORESET 0 is configured with the corresponding SSB. Here, since there is only one corresponding SSB, QCL information of CORESET 0 is changed from QCL information configured by two TCI states to QCL information corresponding to one SSB. That is, CORESET 0 is capable of transmitting an MTRP PDCCH before a RACH procedure, but only the STRP PDCCH transmission is possible after the RACH procedure. Therefore, in order to transmit an MTRP PDCCH again in CORESET 0, two TCI states should be activated again by a MAC CE.

The present disclosure proposes the following to enable MTRP PDCCH transmission through CORESET 0 still after a RACH procedure without such additional signaling.

Only one of two TCI states associated (activated) with a MAC CE in CORESET 0 may be substituted with an SSB found (identified) by a RACH procedure. For example, a TCI state of the first or lowest/highest TCI state ID is substituted with an SSB found (identified) by a RACH, and the remaining TCI state may be activated in CORESET 0 as it is. As a result, even after a RACH procedure, MTRP PDCCH transmission is still possible through CORESET 0. Alternatively, a base station may configure/indicate a UE which TCI state to be substituted with an SSB found (identified) by a RACH.

A DCI format configurable in a CSS/a USS in Rel-16 NR and an RNTI configurable for each DCI format are as follows.

i) CSS
DCI format 1-0 (fallback): C-RNTI or CS-RNTI or MCS-C-RNTI (2-bit downlink assignment index (DAI)), P-RNTI (paging-RNTI), SI-RNTI, RA-RNTI, TC-RNTI (temporary cell-RNTI) (DAI field is only reserved), msgB-RNTI DCI format 0-0 (fallback): C-RNTI or CS-RNTI or MCS-C-RNTI, TC-RNTI DCI format 2-x (x is one of 0, 1, 2, 3): SFI-RNTI (slot format indication-RNTI), INT-RNTI (interruption-RNTI), TPC-RNTI (transmit power control-RNTI)

ii) USS
DCI format 1-0 (fallback): C-RNTI or CS-RNTI or MCS-C-RNTI (2 bit DAI)

DCI format 1-1: C-RNTI or CS-RNTI or MCS-C-RNTI (2/4 bit DAI)

DCI format 0-0 (fallback): C-RNTI or CS-RNTI or MCS-C-RNTI

DCI format 0-1: C-RNTI or CS-RNTI or SP-CSI-RNTI (semi persistent-CSI-RNTI) or MCS-C-RNTI:

The above description represents a DCI format configurable in each CSS/USS in Rel-16 NR, and an RNTI configurable for each DCI format. For example, DCI format 1-0, 0-0, 2-x may be configured in a CSS, and if DCI format 1-0 is configured in a CSS, C-RNTI or CS-RNTI or MCS-C-RNTI, P-RNTI, SI-RNTI, RA RNTI, TC RNTI (DAI field is only reserved), msgB-RNTI, etc. may be configured.

Embodiment 3: when a PDCCH Having a Special Purpose is Transmitted in a CORESET in which Two TCI States are Configured (e.g., in Particular RACH Operation), the Following Method May be Applied PDCCH types are as follows.
i) Type0-PDCCH CSS (for Scheduling a System Information Block 1 (SIB1) PDSCH)

For a DCI format with CRC scrambled by SI-RNTI, a CORESET/SS set may be configured by a PBCH (i.e., time/frequency resource and monitoring period, etc.). Here, a resource element group (REG) bundle size (=6), an interleaver row size (=2), and a precoder granularity (=REG bundle size) are predefined.

An aggregation level (AL) and the number of PDCCH candidates for each AL are predefined (i.e., AL 4: 4, AL 8: 2, AL 16: 1)

CORESET ID=0, SS set ID=0 ii) Type0A-PDCCH CSS (for Scheduling Other System Information (OSI) PDSCH Other than SIB1), Type2-PDCCH CSS (for Paging)

For a DCI format with CRC scrambled by SI-RNTI (in case of Type0A), P-RNTI (in case of Type2), if a UE is not provided with a CORESET for Type0A/Type2 CSS, the corresponding CORESET is same as a CORESET for Type0-PDCCH CSS.

An SS set is configured by higher layer signaling (e.g., searchSpaceOtherSystemInformation (in case of Type0A) and pagingSearchSpace (in case of Type2).

AL and the number of PDCCH candidates for each AL are predefined (i.e., AL 4: 4, AL 8: 2, AL 16: 1)

iii) Type1-PDCCH CSS (for Random Access (RA))

For a DCI format with CRC scrambled by RA-RNTI or TC-RNTI, if a UE is not provided with a CORESET for Type1 CSS, the corresponding CORESET is the same as a CORESET for Type0-PDCCH CSS.

An SS set is configured by higher layer signaling (e.g., ra-SearchSpace).

iii) Type3-PDCCH CSS (for Multicast Control)

A DCI format with CRC scrambled by INT-RNTI, SFI-RNTI, TPC-PUSCH-RNTI, TPC-PUCCH-RNTI, TPC-SRS-RNTI, C-RNTI, MCS-C-RNTI, or CS-RNTI(s) may be configured.

As described above, in Rel-16 NR for transmitting system information, for a RACH, for paging, for transmitting multicast control information, as described above, type 0, type 0a, type 1, type 2, and type 3 PDCCHs are defined. A MTRP PDCCH transmission scheme may be applied/configured only to some PDCCHs of these PDCCH types. For a PDCCH type to which an MTRP PDCCH is applied, a UE may receive an MTRP PDCCH using all of the plurality of TCI states of a CORESET configured for the corresponding PDCCH transmission. For other PDCCH types, a UE may receive a STRP PDCCH by using one TCI state among a plurality of TCI states of a CORESET configured for the corresponding PDCCH transmission. For example, in case of type 0, as a PDCCH used for initial access, there is a need for a UE to receive it before RRC connection. Therefore, a type 0 PDCCH may be transmitted and received in a STRP PDCCH transmission method. On the other hand, since a UE receives type 0a after RRC connection, type 0a may be transmitted and received using an MTRP PDCCH transmission method.

In addition, in a RACH operation, a UE receives a type 1 PDCCH, where an MTRP PDCCH transmission scheme may be applied to some or all of the RACH operation. In detail, a procedure for a UE to receive DCI in an RACH operation is as follows.

When receiving Msg (message) 2 (i.e., random access response (RAR)), a UE receives DCI format 1-0 using RA-RNTI (i.e., RA-RNTI is scrambled). (i.e., corresponding to the second step (step 2) in a random access procedure)

Thereafter, for retransmission of Msg 3, a UE receives DCI format 0-0 using TC-RNTI. (i.e., corresponding to the third step (step 3) in a random access procedure)

Thereafter, when receiving Msg 4, a UE receives DCI format 1-0 using TC-RNTI. (i.e, corresponding to the fourth step (step 4) in a random access procedure)

As such, a UE receives DCI for RACH in various steps, and if a plurality of TCI states of a CORESET used in a RACH procedure are configured, it is necessary to determine at which step among steps 2, 3, and 4 and which QCL reference RS is used to receive DCI.

In the existing scheme, a UE receives DCI of steps 2, 3 and 4 using an SSB (as a QCL reference RS) found/used by the UE in RACH MSG 1. That is, even if a plurality of TCI states of a CORESET are configured, a UE ignores the corresponding TCI states and receives DCI using an SSB found in MSG 1. As a result, MTRP PDCCH transmission in steps 2, 3, and 4 cannot be applied.

To improve this, only one of the two TCI states configured in a CORESET is substituted with an SSB found in MSG 1, and the remaining TCI state may be used as it is. Accordingly, it is proposed that a UE receives DCI in an MTRP PDCCH scheme using two QCL reference RSs. Among two TCI states, the substituted TCI state (with SSB) may be designated/configured by a base station, or may be predetermined as the n-th TCI state or the lowest/highest TCI state index, etc. This method may be applied to one or more steps of steps 2, 3 and/or 4. In addition, the method proposed for RACH may be applied in a beam failure recovery process.

Alternatively, if a plurality of TCI states of a CORESET used in a RACH procedure are configured, a UE may receive an MTRP PDCCH using the plurality of TCI states instead of an SSB. For example, if this is used in step 4, when TC-RNTI is scrambled in DCI format 1-0, a UE may perform MTRP PDCCH reception using all of the plurality of TCI states configured in a CORESET for the DCI reception. On the other hand, in the remaining steps, a UE may perform STRP PDCCH reception using only a specific TCI state among the plurality of TCI states configured in a CORESET. Likewise, this method may be applied to one or more of steps 2, 3 and/or 4.

In addition, Type 3 PDCCH may be configured to be transmitted and received only for a specific RNTI in an MTRP PDCCH transmission method.

Similarly, only for a specific DCI format (e.g., fallback DCI (e.g., DCI 0-0, DCI 1-0) or non-fallback DCI (e.g., DCI 0-1, DCI 1-1) or a specific DCI format), a UE may receive an MTRP PDCCH using all of the plurality of TCI states configured in a CORESET in which the corresponding DCI is received. And, for the remaining DCI format, a UE may receive a STRP PDCCH by using one TCI state among the plurality of TCI states configured in a CORESET in which the DCI is received.

The above proposal has been described as an example in which a plurality of TCI states are configured in one CORESET, but as before, even when one TCI state is configured in a CORESET and two CORESETs are configured for an MTRP PDCCH, the above proposal may be applied. In this case, a plurality of TCI states configured in a CORESET in the above description may be substituted with a plurality of CORESETs in which one TCI state is configured, respectively. In addition, in the above description, one TCI state among a plurality of TCI states configured in a CORESET may be substituted with one CORESET among a plurality of CORESETs. For example, even if two CORESETs and two (or one) SS sets are configured for an MTRP PDCCH, according to a DCI format/RNTI/PDCCH type/US S/CSS configuration, etc., a UE assumes an MTRP PDCCH (i.e., MTRP PDCCH repeated transmission/divided transmission/SFN), so that the UE may attempt to decode the PDCCH received from the CORESET. Alternatively, a UE may attempt to decode a PDCCH by assuming a STRP PDCCH for each CORESET and SS set as before.

Embodiment 4: The Following Method May be Applied to Count Blind Decodings (BDs) and/or Control Channel Elements (CCEs) of SFN CORESET In the present disclosure, an SFN CORESET may be understood as a CORESET in which different QCL type D RSs are configured in one CORESET (e.g., by two TCI states for the corresponding CORESET). That is, the same PDCCH is transmitted in the same CORESET by MTRP, but each TRP may transmit based on different QCL type D RSs configured in the corresponding CORESET.

A UE may count PDCCH BDs (/the number of CCE channel estimations) for a specific time unit (TU) (e.g., 1 slot), and determine whether a PDCCH is overbooked by comparing it with BD (/the number of CCE channel estimations) limit of the UE. If PDCCH overbooking occurs, a UE may perform an operation of not monitoring a specific SS according to a predetermined rule.

If a PDCCH is transmitted repeatedly or dividedly, it may affect the UE counting the number of PDCCH BDs. For example, in case of repeated PDCCH transmission, a UE should additionally perform an operation of decoding by combining the repeatedly transmitted PDCCH candidates in addition to individual decoding the repeatedly transmitted PDCCH candidates. Accordingly, the number of BDs increases compared to the existing one. If a PDCCH repeated/divided transmission method is applied only to a PDCCH of a specific DCI format/RNTI/PDCCH type/USS/CSS, a UE may count the number of BDs differently depending on whether it is a PDCCH repeated/divided transmission method in consideration of a DCI format/RNTI/PDCCH type/USS/CSS for each PDCCH. For example, it is assumed that DCI formats 0-0, 1-0, 2-0, 2-1 are configured in a SS set configured with a CSS, and only DCI formats 0-0, 1-0 are configured to apply an MTRP PDCCH repetition transmission scheme. In this case, when performing BD for DCI format 0-0 (or 1-0) for each PDCCH candidate of the corresponding SS set, a UE may count the number of BDs by adding combining BDs for repeated transmission. On the other hand, when performing BD for DCI format 2-0 (or 2-1), a UE may count the number of BDs in the conventional manner.

When a PDCCH is SFN transmitted (using a plurality of TCI states), it may affect a UE counting the number of CCEs. For example, when TRPs 1 and 2 transmit an SFNed PDCCH in FR2, a UE should perform channel estimation using different QCL-D RSs for each of the PDCCH received from TRP 1 (i.e., the PDCCH for channel estimation with the first TCI state) and the PDCCH received from TRP 2 (i.e., the PDCCH for channel estimation with the second TCI state). As a result, it is necessary to count the number of CCEs twice as much as before. That is, if a specific PDCCH candidate configured with an aggregation level L is transmitted using an SFN PDCCH transmission method, a UE may count 2*L instead of L when CCE counting the corresponding PDCCH candidate. If N TCI states are configured in a CORESET, it can be counted as N*L.

According to the current NR standard, if CCEs of PDCCH candidates i) correspond to different CORESET indices or ii) correspond to different first symbols for reception of respective PDCCH candidates, the CCEs of the PDCCH candidates do not overlap.

As described above, according to the current standard, an operation for determining the number of non-overlapped CCEs is defined. For double counting the number of CCEs in an SFN PDCCH transmission scheme according to the proposed scheme, at least one of the following conditions may be additionally defined.

If CCEs of PDCCH candidates correspond to the same CORESET index having different QCL type D RS, the CCEs of the PDCCH candidates do not overlap.

If CCEs of PDCCH candidates correspond to the same CORESET having different TCI states, the CCEs of the PDCCH candidates do not overlap.

According to the current standard, when checking a CCE limit (=limit of the number of CCE channel estimations), according to a predetermined priority rule, the number of CCEs (in the present disclosure, for convenience of description, the number of CCE channel estimations is referred to as the number of CCEs or the number of non-overlapped CCEs) of each SS set is sequentially added and compared with the CCE limit. If the sum of the number of CCEs of a SS set of a CORESET in which 2 TCI states are configured and the number of CCEs of the previously checked SS set exceeds the CCE limit, the SS set of the corresponding CORESET is dropped and not monitored.

In this case, in order to reduce drop probability and monitor as many PDCCH candidates as possible, the following is proposed. Among two TCIs of a CORESET in which two TCIs are configured, one specific TCI is configured as a representative TCI of the corresponding CORESET, and the remaining TCI may be ignored as not configured. As a result, the corresponding CORESET is no longer (double) counted as two CCEs, and may not exceed the CCE limit as it is counted the same as before. If the CCE limit is not exceeded, the CORESET may be monitored using only a representative TCI (i.e., STRP PDCCH transmission/reception), whereas if the CCE limit is exceeded, the corresponding CORESET may not be monitored.

Alternatively, if a CORESET in which two TCIs are configured exceeds the CCE limit as it requires a large number of CCE channel estimations, by comparing the number of CCE channel estimations and the CCE limit for a SS set (associated with a CORESET in which one TCI state is configured) having the next priority, an opportunity to monitor the corresponding SS set may be provided.

Embodiment 5: With Respect to an SFN CORESET, the Following Method May be Applied in a Collision Situation Between CORESETs Having Different QCL Type D RSs According to the current standard, the following operation is defined for a collision between different CORESETs with different QCL type D RS.

If a UE i) is configured for a carrier aggregation operation or for a single cell operation in the same frequency band, and ii) monitors an overlapping PDCCH monitoring occasion in multiple CORESETs with the same or different QCL-typeD properties on an activated DL BWP(s) of one or more cells, The UE i) monitors PDCCHs only in 'one CORESET', and ii) monitors PDCCHs in one or more CORESETs having the same QCL-typeD properties as the 'one CORESET' among the multiple CORESETs on an activated DL BWP of one of the one or more cells.

The 'one CORESET' corresponds to a CSS set having the lowest index in a cell which has the lowest index and includes a CSS; otherwise, it corresponds to a USS set having the lowest index in a cell having the lowest index.

The lowest USS set index is determined for all USS sets having at least one PDCCH candidate in overlapping PDCCH monitoring opportunities.

In order to determine the 'one CORESET', it is considered that an SS/PBCH block (SSB) has different QCL-TypeD properties from a CSI-RS.

In order to determine the 'one CORESET', a first CSI-RS associated with an SS/PBCH block in a first cell and a second CSI-RS in a second cell also associated with the SS/PBCH are the same QCL-typeD properties.

Assignment of non-overlapping CCEs with PDCCH candidates for PDCCH monitoring follows all SS sets associated with the multiple CORESETs on the activated DL BWP(s) of the one or more cells.

The number of activated TCI states is determined from the multiple CORESETs.

As described above, when multiple CORESETs having different QCL-typeD properties (i.e., spatial Rx parameter or QCL type D RS) collide in the same symbol(s), priority is determined based on a CSS/USS/cell index/SS set index. One CORESET is selected according to the priority, and CORESETs configured with the same QCL D RS of the corresponding CORESET are monitored, and the other CORESETs are not monitored. That is, in R-16, a UE cannot simultaneously receive PDCCHs configured with different QCL type D RSs, but can receive only PDCCH corresponding to one QCL type D RS.

In the future, if a UE has capability to simultaneously receive a plurality of (e.g., two) PDCCHs configured with different QCL type D RS, a maximum of two CORESETs may be selected according to the priority. For convenience of description, it is assumed that a UE receives simultaneously two PDCCHs, but the present disclosure is not limited thereto and the present method may be applied even in a situation in which a UE can receive simultaneously three or more PDCCHs. Here, if two QCL type D RSs are configured in the selected CORESET, only one CORESET may be selected. That is, if a maximum of two PDCCHs of different QCL type D RSs can be simultaneously received, CORESETs may be selected until there are two different QCL type D RSs in the order of priority. Whether to monitor a CORESET(s) may be determined by comparing QCL type D RSs of the selected COERSET with QCL D RSs of the non-selected CORESET. Specifically, a case in which an unselected CORESET is an existing CORESET in which one TCI state is configured and a case in which a CORESET in which two TCI states are configured will be described below.

i) If a QCL D RS of a CORESET in which one TCI state is configured is included in the 'QCL type D RS of the selected COERSET', a UE monitors the corresponding CORESET, otherwise the UE may not monitor.

ii) If a QCL D RS of a CORESET in which two TCI states are configured is included in the 'QCL type D RS of the selected COERSET' (all or part), the case may be further subdivided and considered as follows.

Case 1: Only one of QCL D RSs of a CORESET in which two TCI state are configured is included in the 'QCL type D RS of the selected COERSET'

Alt 1) A UE may monitor the CORESET by using only the TCI state corresponding to the 'QCL type D RS of the selected COERSET' among two TCI states of the corresponding CORESET. That is, the CORESET was originally configured for SFN PDCCH transmission, but in this case, it may be used for the existing STRP PDCCH transmission.

Alt 2) A UE may monitor the corresponding CORESET by using both TCI states of the corresponding CORESET. It is assumed that the number of CORESETs having different QCL type D RSs that can be simultaneously monitored (or the number of different QCL type D RSs that can be simultaneously monitored) as reported by a UE is N, and the number of QCL type D RSs of the selected COERSET is M. Here, when M is less than N, since the capability to simultaneously receive N-M QCL D RSs remains, a UE can use all of the 2 TCI states of the CORESET by using the capability.

Alt 3) A UE may not monitor the corresponding CORESET.

Case 2: All QCL D RSs of a CORESET in which two TCI states are configured are included in the 'QCL type D RS of the selected COERSET'

A UE may monitor the CORESET by using all of the two TCI states configured in the corresponding CORESET.

For example, a situation in which the following three CORESETs collide (i.e., any one or more symbols overlap) may be considered.

CORESET 1 in which two TCI states are configured (e.g., TCI state 1, 2)

CORESET 2 in which two TCI states are configured (e.g., TCI state 1)

CORESET 3 in which one TCI state is configured (e.g., TCI state 3)

Here, it is assumed that QCL-typeD RSs for TCI states 1, 2, and 3 are different from each other. In addition, it is assumed that a UE can simultaneously monitor up to two CORESETs configured with different QCL D RSs (N=2).

i) If CORESET 1 is selected according to priority, a UE monitors CORESET 2 using TCI state 1, and may not monitor CORESET 3.

ii) According to priority, when both CORESET 2 and 3 are selected

Alt 1) A UE may monitor CORESET 1 using only TCI state 1. In this case, a PDCCH of CORSET 1 may be received as a non-SFN (/STRP PDCCH transmission) PDCCH. That is, although reliability improvement cannot be achieved through SFN, a base station can still transmit a PDCCH using CORESET 1 and TCI state 1.

Alt 2) Since a UE should already monitor a CORESET corresponding to N QCL D RSs, Alt 2 cannot be applied.

Alt 3) A UE may not monitor CORESET 1. That is, CORESET 1 is configured for SFN PDCCH transmission, but since only some TCI states of CORESET 1 can be received due to the result of a CORESET selected with priority, a UE may not monitor CORESET 1.

iii) If CORESET 2 is selected according to priority (since only one TCI state of CORESET 1 is the same as CORESET 2), the following alternatives are proposed for whether CORESET 1 should be monitored.

Alt 1) A UE may monitor CORESET 1 using only TCI state 1. In this case, CORESET 1 may follow a non-SFN (/STRP PDCCH transmission) operation.

Alt 2) A UE may monitor CORESET 1 using both TCI states 1 and 2. Since a UE has capability to receive two PDCCHs having different QCL-typeD, TCI state 2 may be additionally used, and as a result, an SFN PDCCH may be received.

Alt 3) A UE may not monitor CORESET 1.

It is assumed that two TCI states configured in CORESET 1 are defined as different QCL properties (e.g., Doppler shift, Doppler spread, delay spread, average delay, Spatial Rx parameter), and only one TCI state is used through the proposed method. In this case, a QCL reference RS defined in the one TCI state is used as it is, but for QCL property, a union of QCL properties defined in the two TCI states may be applied. As a result, a UE can perform channel estimation by deriving all QCL properties necessary for PDCCH reception of CORESET 1 from the QCL reference RS.

Alternatively, if there is a CORESET in which two TCI states are configured among CORESETs in which collision occurs, one of the two TCI states of the corresponding CORESET is selected as a representative TCI state of the corresponding CORESET, and the remaining TCI state may be ignored by assuming that it is not configured. Thereafter, a UE may select a CORESET according to a determined priority rule and monitor a PDCCH. Here, a representative TCI state may be configured by a base station and indicated to a UE, or may be determined as a specific TCI state (e.g., n-th (n is a natural number) TCI state or the lowest/highest TCI state index, etc.).

In another method, by enhancing a priority rule, a higher priority may be configured in a CORESET in which multiple TCI states are configured. That is, in addition to the existing method of determining priority according to a CSS/USS/cell index/SS set index, by comparing a CORESET in which multiple TCI states are configured with a CORESET in which single TCI is configured, the CORESET in which multiple TCI states are configured may have higher priority (or conversely, a single TCI CORESET may have a higher priority). This may increase the possibility of transmission/reception of high reliability traffic by prioritizing a CORESET configured for reliability improvement over a CORESET that are not.

Additionally, when a UE is configured with CORESET pools, the UE may distinguish i) the number of CORESETs with different QCL-typeD RSs that can be monitored simultaneously per CORESET pool and ii) the number of CORESETs with different QCL-typeD RSs that can be simultaneously monitored for all CORESET pools regardless of the CORESET pool, and report them to a base station. Alternatively, CORESET pools are configured, and when CORESET collision occurs, a CORESET may be independently selected by applying a priority rule for each CORESET pool. In this case, even if there is a CORESET in which two TCI states are configured, one specific TCI state among the two TCI states is configured as a representative TCI state of the corresponding CORESET, and the remaining TCI state may be ignored as not configured. As a result, since a UE can receive one QCL-typeD RS for each CORESET pool, the UE can receive a PDCCH using one QCL-typeD RS for each TRP corresponding to each pool. On the other hand, if only one CORESET pool is configured or any CORESET pool is not configured, both TCI states of a CORESET in which two TCI states are configured may be valid when CORESET collision occurs.

In the above-described proposed method, it is assumed that a UE can receive two PDCCHs configured with different QCL type D RSs for convenience of description, but the present invention is not limited thereto. That is, even when a UE has ability to receive N (N>2) PDCCHs configured with different QCL type D RSs, the above proposed methods can be extended and applied. In addition, in the present disclosure, a CORESET in which N TCI states are configured means a CORESET in which N different QCL type D RSs are configured.

Embodiment 6: In PDCCH Repeated Transmission Based on MTRP FDM, the Following Method May be Applied when CORESET Collision Occurs As described above, configuration information related to each CORESET may include information such as an antenna port QCL indicating QCL information of a DM-RS antenna port for PDCCH reception in the corresponding CORESET from a set of antenna port QCLs provided by a TCI state. When a terminal is provided with a single TCI state for a CORESET or when a terminal receives a MAC CE activation command for one of TCI states for a CORESET, the terminal assumes that a DM-RS antenna port associated with PDCCH reception in the CORESET is QCL (quasi co-located) with one or more DL RSs configured by the TCI state.

In the present disclosure, a quasi co-location (QCL) configuration may include information for specifying a DL RS having a QCL relationship (e.g., DL RS identifier/index) and information for specifying a channel characteristic having a QCL relationship (e.g., QCL type (qcl-Type)) (indicates one of 'QCL-TypeA', 'QCL-TypeB', 'QCL-TypeC', and 'QCL-TypeD').

Here, if 'QCL-TypeD' is configured to different CORESETs with different DL RSs, it can be considered that the CORESETs are configured with different QCL 'TypeD' properties. For example, an SS/PBCH block (SSB) may be considered to have different QCL 'TypeD' properties from a CSI-RS.

However, a first CSI-RS associated with an SS/PBCH block (SSB) in a first cell and a second CSI-RS in a second cell also associated with the SS/PBCH block (SSB) may be assumed to have the same QCL 'TypeD' properties.

That is, a configuration with the same QCL 'TypeD' properties means a configuration of QCL 'TypeD' for the same DL RS in a narrow sense, but it may be interpreted broadly to include a configuration of QCL 'TypeD' for different DL RSs that are mutually related (that is, associated with the same RS).

In the present disclosure, the fact that CORESETs have the same/different QCL configuration for a spatial reception parameter may be interpreted that the CORESETs are configured with the same/different QCL 'TypeD' properties. In addition, the fact that CORESETs have the same/different QCL configuration for a spatial reception parameter means that the CORESETs have a QCL type (qcl-Type) set to the same/different QCL 'TypeD' properties.

Hereinafter, for convenience of description, it is mainly described by assuming that the case where QCL type-D RSs in a QCL configuration (or QCL type/information) are different from each other means a QCL type set with different QCL-type D properties, as described above, the present disclosure is not limited thereto.

For example, it is assumed that CORESET 0 in which QCL type-D RS 0 is configured is associated with SS set 0, CORESET 1 in which QCL type-D RS 0 is configured is associated with SS set 1, and CORESET 2 in which QCL type-D RS 2 is configured is associated with SS set 2. Here, in a frequency range (FR) 2, a single panel UE may configure a reception beam (Rx beam) to only one QCL type-D RS at a time.

Here, as described in the embodiment 5 above, when CORESETs overlap (in a time domain) (i.e., when overlapping one or more PDCCH monitoring occasions in a plurality of CORESETs having different QCL-typeD properties), a CORESET to be monitored may be determined according to a priority rule. That is, an SS type is considered first, a cell index is considered next, and an SS set index is considered next. Here, when SS set 0 and SS set 2 are linked for repeated PDCCH transmission (i.e., PDCCH transmission carrying the same DCI) based on FDM, it is necessary to clearly define an operation of a terminal.

According to the Rel-17 standardization meeting, two CORESETs may be configured for MTRP PDCCH transmission, and these two CORESETs may be TDMed to repeatedly transmit the same DCI at different time, or FDMed to repeatedly transmit the same DCI at the same time. When two CORESETs are FDMed and transmitted, a UE should be able to simultaneously receive CORESETs with two different QCL-type D properties (e.g., different QCL-type D RS) at one moment (e.g., in one or more symbols). This is different from the existing standard method of selecting one CORESET having one QCL-type D RS in case of CORESET collision/overlapping (i.e., when a UE is configured to simultaneously monitor CORESETs in which different QCL-type D RSs are configured).

Here, collision/overlapping between a plurality of CORESETs in which different QCL type-D properties (e.g., different QCL-type D RS) are configured may mean collision/overlapping between one or more monitoring occasions in a plurality of CORESETs in which different QCL type-D properties are configured.

Hereinafter, when the same DCI is FDMed and transmitted repeatedly at the same time (i.e., in one or more symbols), a method for a UE to resolve collision/overlapping between a plurality of CORESETs is proposed.

In the present disclosure, when the same DCI is FDMed and transmitted repeatedly at the same time (i.e., in one or more symbols), collision/overlapping between a plurality of CORESETs may mean that a plurality of CORESETs through which a PDCCH carrying the same DCI is transmitted is collided/overlapped in a time domain.

Alternative (Alt) 1) A UE may select the highest priority CORESET by reusing the priority rule defined in the current Rel-16 standard. For example, if present, a CORESET corresponding to a CSS set having the lowest index in a cell which has the lowest index and includes CSS sets may be selected. Otherwise, a CORESET corresponding to a USS set having the lowest index in a cell having the lowest index may be selected.

If the selected CORESET is linked for repeated transmission with another CORESET, and the two linked CORESETs are used for FDM PDCCH repeated transmission (i.e., for the same DCI transmission), a UE may operate as follows. Here, that CORESETs A and B are linked for FDM PDCCH repeated transmission may be configured to a UE by a higher layer signal (e.g., RRC signal). In other words, a UE may know (i.e., configured to a UE) that CORESETs A and B are linked for FDM PDCCH repeated transmission, through a higher layer signal (e.g., RRC signal) indicating an explicit linkage between a specific SS set associated with CORESET A and a specific SS set associated with CORESET B. In other words, when the linked SS sets are configured to overlap a monitoring occasion at the same time (i.e., in one or more symbols) and frequency resources of CORESET A and B are configured differently, a UE can determine that two CORESETs (i.e., a first CORESET selected by a priority rule and a second CORESET linked to the first CORESET) are used for FDM PDCCH repeated transmission (i.e., for the same DCI transmission). In this case, the linked CORESET is also selected, and a UE may select a total of two CORESETs (i.e., a first CORESET selected by a priority rule and a second CORESET linked to the first CORESET).

In other words, a QCL configuration for a second CORESET (CORESET B) may include different information on QCL type-D properties (e.g., QCL type-D RS) from a first CORESET (CORESET A). And, for transmission of a PDCCH carrying the same DCI, it may be determined as a CORESET associated with a second search space set linked to a first search space set associated with a first CORESET. And, a UE may monitor/receive a PDCCH in the selected first CORESET (CORESET A) and the second CORESET (CORESET B).

If the CORESETs selected as above are CORESETs A and B, a UE may monitor (i.e., PDCCH monitoring/receiving) any CORESET(s) configured with the same properties (e.g., same QCL type-D RS) as QCL type-D properties (e.g., QCL type-D RS) of CORESET A in addition to CORESETs A and B, and the UE may also monitor (i.e., PDCCH monitoring/receiving) any CORESET(s) configured with the same properties (e.g., same QCL type-D RS) as QCL type-D properties (e.g., QCL type-D RS) of CORESET B in addition to CORESETs A and B. The UE may not monitor the other CORESETs.

The operation may be expressed in a different way, for example, a higher priority among CORESETs linked for FDM PDCCH repeated transmission is configured as a representative priority, and it may be expressed as competing with other CORESETs. For example, when CORESETs A and B are linked for FDM PDCCH repeated transmission, a higher priority among the two CORESETs is configured as a representative priority, and it may be compared with CORESET C where CORESET collision/overlapping has occurred. If the representative priority is higher than the priority of CORESET C, CORESETs A and B are selected, otherwise CORESET C may be selected.

Alt 2) Reuse the current priority, the first priority CORESET and the second priority CORESET may be selected.

Additionally, the second priority CORESET may be selected from among CORESETs linked with the same SS type and/or the same cell index as the first priority CORESET. For example, CORESETs linked for FDM PDCCH repeated transmission may be limited for the same SS type/same cell index. In this case, a CORESET linked with the first priority CORESET may be selected as the second priority CORESET through the above operation.

The following may be considered as an example of the alternatives (Alt) 1 and 2.

First, it is assumed that SS sets 0 and 1 are mapped (associated) with CORESET 0, SS sets 2 and 3 are mapped (associated) with CORESET 1, and SS set 4 is mapped (associated) with CORESET 2. In addition, it is assumed that SS set 0 and SS set 4 are linked (i.e., the same monitoring occasion) for FDM PDCCH repeated transmission. In addition, it is assumed that all SSs are USSs in the same cell.

In the above example, five SS sets that are USSs are configured, three CORESETs are configured, and SS sets 0 and 4 are linked for FDM PDCCH repeated transmission. Here, when SSs 0,1,2,3,4 are configured at the same time, and CORESETs 0,1,2 all collide (i.e., overlap), two CORESETs may be selected by applying alternative (Alt) 1 or 2.

First, in case of Alt 1, CORESET 0 corresponding to SS set 0 may be selected according to a priority rule. In addition, since CORESET 0 is linked with CORESET 2 for FDM PDCCH repeated transmission, CORESET 2 may be additionally selected.

Next, in case of Alt 2, CORESET 0 corresponding to the first priority and CORESET 1 corresponding to second priority may be selected.

Alternative 3) In case of Alt 2 (that is, select the first priority CORESET and the second priority CORESET by reusing the current priority rule) to solve CORESET collision/overlapping, a problem may occur in FR 2. For example, when a UE cannot receive the two selected CORESETs at the same time, a base station considers that a UE monitors both the first priority CORESET and the second priority CORESET, but the UE can actually receive only one of the two CORESETs.

To solve this, based on group-based beam reporting recently reported by a UE, it may be determined whether to monitor both the first priority CORESET and the second priority CORESET or only the first priority CORESET among them. For example, if both a beam (/QCL type D RS) of the first priority CORESET and a beam (/QCL type D RS) of the second priority CORESET are included in the (most) recently reported group-based beam reporting by a UE, the UE may receive both CORESETs at the same time. Otherwise, a UE may monitor only a CORESET having a higher priority. (in addition, of course, CORESETs configured with the same QCL type-D RS as one (or more than one) CORESET selected for monitoring may be monitored together as before.)

Further, in the Rel-17 NR standard, new group-based beam reporting may be introduced for MTRP transmission. The above proposed method may be applied only to new group-based beam reporting. Here, new group-based beam reporting means a method in which two channel measurement resource (CMR) sets are configured corresponding to two TRPs for group-based beam reporting, and a UE selects one CMR in each set and reports the two selected CMRs as one group.

The above method may or may not be applied depending on whether two selected CORESETs are linked for PDCCH repetition (i.e., repeated transmission of the same DCI) or not. If two selected CORESETs are linked for PDCCH repetition (the linkage between these two CORESETs can be determined by whether SS sets associated with the two CORESETs are linked to each other by RRC), it is determined that the CORESETs can be simultaneously received regardless of group-based beam reporting, and a UE may monitor both CORESETs. If two selected CORESETs are not linked for PDCCH repetition, a UE may compare the most recent group-based beam reporting with a CORESET beam (/QCL type-D RS) according to the proposed method, and determine whether to monitor both.

The above method may or may not be applied depending on whether there is a CORESET linked for PDCCH repetition among CORESETs in which collision/overlapping has occurred. That is, when a linked COERSET exists, a UE may monitor the linked CORESET. Otherwise, a UE may determine whether to monitor both by comparing the most recent group-based beam reporting with a CORESET beam according to the proposed method.

Alternative 4) CORESETs may be primarily selected based on the most recent group-based beam reporting when colliding/overlapping between a plurality of CORESETs. In addition, the first priority/second priority CORESET may be selected by applying the existing priority rule from the CORESETs selected primarily. For example, if values of the most recent group-based beam reporting are beams 1 and 2, a priority rule may be applied only to CORESETs in which beams 1 and 2 are configured as QCL type-D RS among CORESETs in which collision/overlapping has occurred. All other CORESETs may not be monitored. A UE may monitor two CORESETs by selecting the first/second priority CORESET from among the CORESETs in which beams 1 and 2 are configured.

The above method may or may not be applied depending on whether there is a CORESET linked for PDCCH repetition among CORESETs in which collision/overlapping has occurred. That is, when a linked COERSET exists, a UE may monitor the linked CORESET. Otherwise, a UE first selects CORESETs based on the most recent group-based beam reporting according to the proposed method and selects two CORESETs.

When collision/overlapping occurs between CORESETs configured different Type-D RSs as QCL sources, a monitoring CORESET may be selected among a CORESET in which MTRP PDCCH repeated transmission is configured and the existing CORESET using the above-mentioned various proposals (alternatives 1 to 4).

Rel-17 MTRP PDCCH repeated transmission has two methods as follows. i) A method in which two TRPs repeatedly transmit a PDCCH by FDM/TDM (i.e., SS sets associated with each of the two CORESETs are configured to be linked for PDCCH repeated transmission, and each PDCCH candidate of the two linked SS sets is TDMed or FDMed and used for the same DCI repeated transmission) and ii) a method in which two TRPs transmit a PDCCH by SFN (i.e., two TCI states are configured/activated in one CORESET, and a UE performs channel estimation of a PDCCH DMRS using two QCL RSs corresponding to the two TCI states through a PDCCH of an SS set associated with the CORESET) may be configured. A PDCCH SFN transmission method is also one of PDCCH repeated transmission methods because two TRPs repeatedly transmit the same DCI/PDCCH on the same frequency/time/spatial (layer or DMRS port) resource. When CORESETs using the two different methods of PDCCH repetition transmission collide, the following proposes for priorities.

First, a CORESET (=TDM/FDM PDCCH repetition CORESET) in which TDM/FDM PDCCH repeated transmission is configured may have higher priority than a CORESET (=SFN CORESET) in which SFN (repetitive) PDCCH transmission is configured. Therefore, a TDM/FDM PDCCH repetition CORESET or a SFN CORESET has a higher priority than the existing CORESET, and a TDM/FDM PDCCH repetition CORESET has a higher priority than a SFN CORESET. The priority between a CORESET in which repeated transmission is configured and a CORESET in which repeated transmission is not configured may be used by adding it to the existing priority of SS type>cell index>SS set ID (i.e., a CSS has priority over a USS, a cell of lower cell index in the same SS type has higher priority, and a lower SS set ID has higher priority in the same cell). For example, higher priority may be given to a SS set and CORESET for MTRP repeated transmission using SS type>whether MTRP repeated transmission or not (and/or MTRP repeated transmission method)>cell index>SS set ID. In addition, the priority may be divided for each MTRP repetition transmission method, and a higher priority may be given to a TDM/FDM PDCCH repetition CORESET than a SFN CORESET.

Alternatively, a CORESET in which SFN PDCCH transmission is configured may have a higher priority than a TDM/FDM PDCCH repetition CORESET.

Alternatively, a base station may configure to a UE which CORESET has a higher priority among a TDM/FDM PDCCH repetition CORESET and a CORESET in which SFN PDCCH transmission is configured.

In addition, the priority between a TDM/FDM PDCCH repetition CORESET and a SFN CORESET and the existing CORESET may be variously defined. For example, the priority may be configured as SFN CORESET>existing CORESET>TDM/FDM PDCCH repetition CORESET. That is, with respect to a MTRP repeated transmission CORESET, it may be configured that the existing CORESET has a higher priority or a MTRP repeated transmission CORESET has a higher priority.

Embodiment 7: In MTRP PDCCH Repeated Transmission, the Following Method May be Applied to Configure PDSCH Processing Time When a UE receives DCI for scheduling a PDSCH from a base station through a PDCCH, the UE attempts to decode the PDSCH based on the scheduling information in the DCI. If a UE succeeds in decoding a PDSCH, the UE may transmit ACK (acknowledgement) information to a base station through a PUCCH. On the other hand, if a UE fails to decode a PDSCH, the UE may transmit negative acknowledgment (NACK) information to a base station through a PUCCH. ACK information and NACK information may be referred to as ACK/NACK or HARQ-ACK information.

According to the current standard, a UE expects that a PUCCH for ACK/NACK transmission for a PDSCH is scheduled after a specific time/time interval (e.g., N1) after receiving the PDSCH. In other words, if the first UL symbol of a PUCCH carrying HARQ-ACK information starts not earlier than L1 symbol, a UE may provide a valid HARQ-ACK message through the PUCCH. Here, L1 is defined as the next UL symbol in which CP starts after N1 after the last symbol of a PDSCH carrying a transport block (TB) to be acknowledged ends. That is, N1 may mean a time duration from the reception of a PDSCH until transmission of a PUCCH carrying a HARQ-ACK for the corresponding PDSCH is started.

Here, the N1 value may be determined based on N1' (in units of the number of symbols) and d1,1 (in units of the number of symbols) (e.g., N1=N1'+d1,1). Here, a UE may report the N1' value (or information for determining the N1' value) to a base station as capability. d1,1 may be determined based on i) the number of symbols of a PDSCH and ii) the number of overlapped symbols of a PDSCH and a PDCCH (i.e., PDCCH carrying DCI scheduling the PDSCH).

For example, when the number of PDSCH symbols is 2 and the number of overlapped symbols is n, it may be determined as d1,1=n. The reason for determining N1 based on the number of overlapped symbols between a PDSCH and a PDCCH is that if PDCCH decoding is not completed at the time when PDSCH reception is completed, a UE is allocated more time until ACK/NACK PUCCH transmission by adding additional time required for PDCCH decoding to N1'. That is, as PDCCH decoding time increases, it is preferable that the N1 value or the d1,1 value increases.

In case of MTRP PDCCH repeated transmission, a UE may perform blind decoding (BD) of each repeated DCI or joint decoding of two DCIs (e.g., combining-based BD). If joint decoding is attempted, more time may be required than individual decoding because of high complexity. Therefore, if a UE performs joint decoding, it is desirable to configure the N1 value, N1' value, or d1,1 value to be larger than before. Accordingly, a UE may directly transmit information on whether joint decoding is performed to a base station. Alternatively, a UE indirectly transmits information on the number of BDs for repeated two DCIs to a base station, so that the base station can know whether joint decoding is performed or not. In the latter case, when the number of BDs for PDCCH candidates 1 and 2 corresponding to two DCIs exceeds 2 times (e.g., 3), a base station may assume that a UE performs joint decoding, and configure the N1 value, the N1' value, or the d1,1 value to be larger than before.

In addition, for example, a UE may additionally report (e.g., as UE capability) to a base station a new parameter N1" in consideration of joint decoding (e.g., soft combining) in addition to the N1'. And, when joint decoding (e.g., soft combining) for multiple PDCCHs is applied, N1 may be determined based on N1" instead of N1'.

Here, for convenience of description, soft combining is exemplified and described as one implementation example of joint decoding, but the present disclosure is not limited thereto. In addition, even if there is no other description in the present disclosure, soft combining may be interpreted and substituted with joint decoding (or another implementation example of joint decoding).

As another example, when one joint decoding (e.g., soft combining) is applied, a UE adds a certain value (referred to as alpha) (e.g., 1 symbol or 2 symbols) of time to the N1' to update the value of N1', and N1 may be determined based on the updated N1'. For example, the alpha value may be predefined or configured by a base station, or the alpha value applied by a UE may be reported to a base station (e.g., through UE capability, etc.).

In addition, an increment for the N1' (or N1) value may vary according to the number of PDCCHs for which joint decoding (e.g., soft combining) is performed (i.e., the number of PDCCHs transmitted repeatedly/dividedly). Accordingly, as the number of PDCCHs repeatedly/dividedly transmitted is increased, an amount of calculation increases, so it is preferable to increase an increment (e.g., in case of joint decoding (e.g., soft combining) of 2 PDCCHs, 1 it increases by 1 symbol, and in case of joint decoding (e.g., soft combining) of 4 PDCCHs, it increases by 2 symbols). In addition, an increment may be configured differently according to subcarrier spacing (SCS), thereby increasing the degree of freedom of a UE implementation. For example, the N1' (or N1) value may be configured differently based on at least one of the number of PDCCHs and/or SCS on which the joint decoding (e.g., soft combining) is performed.

In addition, the proposed method for increasing the N1 may be applied differently according to the number of symbols of the PDSCH. When the number of PDSCH symbols is greater than or equal to a specific value, since sufficient time is given from when PDSCH reception is started until the PDSCH reception is completed, PDCCH decoding may already be completed at the time when the PDSCH reception is completed. Therefore, when the number of PDSCH symbols is greater than or equal to a specific value, the N1 value is not increased, and the N1 increase (the above-described method) may be applied only when the number of PDSCH symbols is less than or equal to a specific value. Alternatively, by adjusting an N1 increase value according to the number of PDSCH symbols, the larger the number of PDSCH symbols, the smaller the N1 increase value may be configured.

Similar to the above-described method, for DCI indicating semi-persistent scheduling (SPS) PDSCH release, an additional processing time margin may be further required until PUCCH transmission carrying a HARQ-ACK corresponding to the DCI starts. The SPS PDSCH release DCI is a DCI for stopping SPS PDSCH transmission, and a UE transmits ACK/NACK information on whether or not decoding of the DCI is successful to a base station. If the DCI is repeatedly transmitted and a UE performs combining-based BD, it may take more time to transmit an ACK/NACK, and the minimum required time for this may be increased than before.

For example, a UE may transmit HARQ-ACK information for the corresponding SPS PDSCH release to a base station in a slot indicated according to a value of a field indicating a HARQ feedback timing (e.g., PDSCH-to-HARQ_feedback timing indication field) in DCI indicating the SPS PDSCH release. Therefore, when a UE transmits information on whether or not joint decoding is performed to a base station, the value of the corresponding field (i.e., timing at which HARQ-ACK information is transmitted to the base station) may be determined based on the corresponding information (i.e., a value larger than the existing value may be indicated). As another example, a specific value may be predefined or configured by a base station, or determined as a value reported by a UE a the base station, and when a UE applies joint decoding (e.g., soft combining), a timing for transmitting HARQ-ACK information to a base station may be determined by adding the specific value to a value indicated by a field indicating HARQ feedback timing in DCI indicating SPS PDSCH release.

Similarly, with respect to an N_pdsch value applied during cross component carrier (CC) scheduling between different subcarrier spaces (SCS) (e.g., a PDSCH of CC 2 is scheduled by DCI transmitted in CC 1), since an additional processing time margin may be further required due to combining-based BD, the corresponding value may be configured to be increased. That is, N_pdsch may mean a minimum required interval between a PDCCH scheduling a PDSCH and a scheduled PDSCH. For example, when a UE transmits information on whether or not joint decoding is performed to a base station, the N_pdsch value may be determined based on the information (or, an N_pdsch value applied when combining-based BD is performed may be predefined). As another example, a specific value may be predefined or configured by a base station, or determined as a value reported by a UE to a base station, and when a UE applies joint decoding (e.g., soft combining), a value obtained by adding the specific value to an N_pdsch value determined according to the existing method may be applied.

Embodiment 8: In Case of PDCCH Overbooking, the Following Method May be Applied

In case of overbooking in a PCell (primary cell) for a USS with two linked SS sets in the same slot/span, it is agreed that one alternative (Alt) is selected in each of the following Cases 1 and 2.

i) Case 1: 2 BDs are counted for two linked candidates.

Alt1: An operation defined in the existing standard is used.

Alt2: Consider an SS set pair together (i.e., keep both or drop both). Here, the priority is based on a lower SS set ID among the pair.

ii) Case 2: 3 BDs are counted for 2 linked candidates.

Alt1: Overbooking is counted for each individual SS set.

Alt1-1: The third BD is counted as a virtual SS set. That is, the virtual SS set for the third BD is dropped before dropping the linked SS sets.

Alt1-2: The third BD is counted as part of an SS set with a higher ID.

Alt2: Consider an SS set pair together (i.e., keep both or drop both). Here, the priority is based on a lower SS set ID among the pair.

As described above, when an MTRP PDCCH repetition method is applied, the above alternatives were discussed for how to count the number of BDs for checking PDCCH overbooking. A method of performing PDCCH BD two times (i.e., Case 1) and a method of performing PDCCH BD three times (i.e., Case 2) for two PDCCH candidates configured a linkage for (two) repeated transmission may be used, and in the former case (i.e., Case 1), the following various implementations are possible. First, BD may be independently performed once for each PDCCH candidate. Second, BD may be performed once independently on the first candidate, and BD may be performed once by combining the first and second candidates. Third, BD may be independently performed once on the second candidate, and BD may be performed once by combining the first and second candidates. Fourth, BD is performed once by combining the first and second candidates, but the number of BDs is counted as 2. Here, Alt 1 of Case 1 is not suitable for the third and fourth implementations because one BD is performed for each candidate. Therefore, the Alt 2 method of BD counting two candidates at once is preferable. As such, the preferred Alt may vary depending on the implementation method, and whether individual candidates can be monitored may vary according to the implementation method in the agreement below. For example, in the third and fourth implementation methods described above, since BD of a linked candidate and BD of an individual candidate are different from each other, it is impossible to monitor an individual candidate with BD of a linked candidate. On the other hand, in the first implementation method described above, an individual candidate can be monitored by BD of a linked candidate.

The agreements at the standardization meeting are as follows.

When one of linked PDCCH candidates uses the same set of CCEs as an individual (unlinked) PDCCH candidate, and when they are all associated with the same DCI size, scrambling, CORESET, Interpretation of the detected DCI is based on the Rel. 17 PDCCH repetition rule (with respect to reference PDCCH candidates).

Here, whether an individual candidate is monitored is determined by UE capability. In both cases, individual candidates are not included in DB limit.

UE capability is introduced for a maximum number of such overlaps.

Since the above-mentioned two issues are related according to the implementation method, in a method of counting BDs for PDCCH overbooking, a method of determining according to whether an individual PDCCH candidate can be monitored is proposed. For example, if monitoring of an individual PDCCH candidate is possible (e.g., a UE may report this as capability), BD count may be performed using Alt 2 in the case 1 or 2, otherwise, BD count may be performed using Alt 1.

Embodiment 9: In Order to Alleviate CSI Computation Delay Requirement Time (or Processing Time), the Following Method May be Applied According to the current standard, if a UE (e.g., FR2 UE) receives a PDCCH (e.g., DCI format 0-0, 0-1, 0-2) including control information for UL (e.g., PUSCH) scheduling, when the corresponding control information triggers aperiodic CSI feedback, the UE expects that a PUSCH for aperiodic CSI feedback is scheduled after a specific time (e.g., Z, Z') from receiving the corresponding PDCCH. If this is not satisfied and a PUSCH is scheduled early (i.e., scheduled shorter than a specific time), a UE may ignore the corresponding PDCCH and not perform PUSCH (i.e., AP CSI feedback) transmission, or may transmit a random value in a PUSCH without calculating/updating CSI.

A UE reports a Z value as capability to a base station as shown in Table 10 and/or Table 11 below. In Tables 10 and 11 below, Z1, Z2, and Z3 are all values for Z, and Z is determined as one of Z1, Z2, and Z3 according to CSI report configuration conditions.

Table 10 exemplifies CSI computation delay requirement 1.

TABLE 10

| | $Z_1$ [Symbols] | |
|---|---|---|
| μ | $Z_1$ | $Z'_1$ |
| 0 | 10 | 8 |
| 1 | 13 | 11 |
| 2 | 25 | 21 |
| 3 | 43 | 36 |

Table 11 exemplifies CSI computation delay requirement 2.

TABLE 11

| | $Z_1$ [Symbols] | | $Z_2$ [Symbols] | | $Z_3$ [Symbols] | |
|---|---|---|---|---|---|---|
| μ | $Z_1$ | $Z'_1$ | $Z_2$ | $Z'_2$ | $Z_3$ | $Z'_3$ |
| 0 | 22 | 16 | 40 | 37 | 22 | $X_1$ |
| 1 | 33 | 30 | 72 | 69 | 33 | $X_2$ |
| 2 | 44 | 42 | 141 | 140 | min(44, $X_3$ + $KB_1$) | $X_3$ |
| 3 | 97 | 85 | 152 | 140 | min(97, $X_4$ + $KB_2$) | $X_4$ |

Table 12 below describes the definitions of Z, Z', etc. defined in the current standard TS 38.214.

TABLE 12

Z, Z' and μ are defined as:

$Z = \max_{m=0,\ldots,M-1}(Z(m))$ and $Z' = \max_{m=0,\ldots,M-1}(Z'(m))$, where M is the number of updated CSI report(s), (Z(m), Z'(m)) corresponds to the m-th updated CSI report and is defined as follows.

($Z_1$, $Z'_1$) of the table 10, if the CSI is triggered without a PUSCH with either transport block or HARQ-ACK or both when L = 0 CPUs (CSI processing unit) are occupied and the CSI to be transmitted is a single CSI and corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or ($Z_1$,$Z'_1$) of the table 11, if the CSI to be transmitted corresponds to wideband frequency-granularity where the CSI corresponds to at most 4 CSI-RS ports in a single resource without CRI report and where CodebookType is set to 'typeI-SinglePanel' or where reportQuantity is set to 'cri-RI-CQI', or TABLE 12-continued ($Z_1$, $Z'_1$) of the table 11, if the CSI to be transmitted corresponds to wideband frequency-
granularity where the reportQuantity is set to 'ssb-Index-SINR', or reportQuantity is set to
'cri-SINR', or
($Z_3$, $Z'_3$) of the table 11, if reportQuantity is set to 'cri-RSRP' or 'ssb-Index-RSRP', where
$X_\mu$ is according to UE reported capability beamReportTiming and $KB_1$ is according to UE
reported capability beam SwitchTiming, or
($Z_2$, $Z'_2$) of the table 11 otherwise.
μ of table 10 and table 11 corresponds to the min($\mu_{PDCCH}$, $\mu_{CSI-RS}$, $\mu_{UL}$), where the $\mu_{PDCCH}$
corresponds to the subcarrier spacing of the PDCCH with which the DCI was transmitted
and $\mu_{UL}$ corresponds to the subcarrier spacing of the PUSCH with which the CSI report is
to be transmitted and $\mu_{CSI-RS}$ corresponds to the minimum subcarrier spacing of the
aperiodic CSI-RS triggered by the DCI.

Since the Z (or Z') value in Table 12 above was designed in consideration of PDCCH decoding time, it is preferable to increase this value when joint decoding (e.g., soft combining) for multiple PDCCHs is performed. For example, the UE may additionally report to a base station a new parameter Z" (i.e., $Z''_1$, $Z''_2$, $Z''_3$) in consideration of joint decoding (e.g., soft combining) in addition to the Z (or Z'). And, when joint decoding (e.g., soft combining) for multiple PDCCHs is applied, Z" may be used instead of Z (or Z').

As another example, when one joint decoding (e.g., soft combining) is applied, a UE may update the Z (or Z') value by adding time as much as a specific value (this is referred to as an alpha value) (e.g., 1 symbol or 2 symbols) to the Z (or Z'), and use the updated Z (or Z'). For example, the alpha value may be predefined or configured by a base station to a UE. Alternatively, the alpha value applied by a UE may be reported to a base station.

In addition, an increment for the Z (or z') value may vary according to the number of PDCCHs for which joint decoding (e.g., soft combining) is performed (i.e., the number of PDCCHs transmitted repeatedly/dividedly). Accordingly, as the number of PDCCHs repeatedly/dividedly transmitted is increased, an amount of calculation increases, so it is preferable to increase an increment (e.g., joint decoding (e.g., soft combining) of 2 PDCCHs increases by 1 symbol, and joint decoding (e.g., soft combining) of 4 PDCCHs increases by 2 symbols). In addition, the increment may be configured differently according to subcarrier spacing (SCS), thereby increasing the degree of freedom of UE implementation. For example, the Z (or Z') value may be configured differently based on at least one of the number of PDCCHs and/or SCS for which the joint decoding (e.g., soft combining) is performed.

The $Z_1$ value of the table 10 or the $Z_1$ value of the table 11 is a value used when a specific condition is satisfied, and was defined as a value smaller than the Z2 value of the table 11. Here, the specific conditions are, as described in the table 12 above, determined by the number of CSI-RS ports, wideband (WB)/subband (SB) of CSI, whether a CSI-RS resource indicator (CRI) is reported, the number of CSI-RSs measured for CSI calculation, a codebook type, whether a PMI is reported, and the number of occupied CPUs, etc.

In addition to these conditions, it may be determined whether to use the $Z_1$ value or the Z2 value according to whether DCI for triggering AP CSI is repeated (i.e., whether the same DCI is repeatedly transmitted). That is, if the same DCI is repeatedly transmitted, a UE may be configured/defined to use the Z2 value instead of the $Z_1$ value even if the specific condition is satisfied. If the same DCI is not repeatedly transmitted, a UE may use the $Z_1$ or $Z_2$ value according to the specific condition.

Alternatively, it may be determined whether to use the $Z_1$ value or the $Z_2$ value based on i) whether the same DCI is repeated (here, if an SS set including PDCCH candidates is linked to another SS set by higher layer signaling (e.g., RRC), it may be determined as repetition of the same DCI) and ii) whether a UE performs joint decoding (e.g., soft combining) for repetition PDCCH candidates. That is, when joint decoding (e.g., soft combining) is performed, it may be configured/defined to use the $Z_2$ value instead of the $Z_1$ value even if the specific condition is satisfied. When joint decoding (e.g., soft combining) is not performed, the Z1 or Z2 value may be used according to the specific condition. Here, whether to perform joint decoding (e.g., soft combining) may be determined according to the number of BDs for two linked PDCCH candidates reported by a UE. For example, when the number of BDs is 2, a base station may assume that joint decoding (e.g., soft combining) is not performed, and when the number of BDs is 3, a base station may assume that joint decoding (e.g., soft combining) is performed.

In addition, a UE may report whether it supports the proposed method or not as UE capability. Therefore, the proposed method is applied only to the supported terminals, and the other terminals use the Z (or Z') value as in the existing method. In addition, when the number of BDs is 2, since both an implementation method of performing joint decoding (e.g., soft combining) and an implementation method of not performing joint decoding are possible, it may be configured/defined so that a terminal additionally reports whether the proposed method is supported. On the other hand, when the number of BDs is 3, since only an implementation method of performing joint decoding (e.g., soft combining) exists, the proposed method may be applied without a report on whether the proposed method is supported.

The above-described proposed method may be equivalently applied to $Z_1'$, $Z_2'$ values and $Z_3$, $Z_3'$ values as well as $Z_1$, $Z_2$ values. That is, the same method may be applied by substituting $Z_1$ with $Z_1'$ and substituting $Z_2$ for $Z_2'$ in the above-described content. In addition, the same method may be applied by substituting $Z_1$ with $Z_3$ and substituting $Z_2$ for $Z_3'$ in the above-described content.

In addition to the method of selecting the $Z_1$ and $Z_2$ values according to the above proposal, similarly, according to whether repetition and/or joint decoding (e.g., soft combining) of the same DCI, it may be determined whether to use the Z (or Z') value of any of the tables 10 and 11 above. For example, when DCI for triggering aperiodic CSI is repeated, the Z (or Z') value may be determined using the table 11 even if the existing conditions for using the table 10 are satisfied. On the other hand, when DCI for triggering aperiodic CSI is not repeated, the table and Z (or Z') values may be determined according to the existing conditions. In case of the table 10, since the value of Z (or Z') is very small, when repetition or joint decoding (e.g., soft combining) is performed, this is because there is a high probability that a UE cannot calculate and report CSI within the Z (or Z') time.

Similarly, when determining the PDSCH processing time or PUSCH processing time, if PDCCH repetition or joint decoding (e.g., soft combining BD) is applied to DCI for scheduling the PDSCH/PUSCH, a larger value may be used instead of a smaller value among a plurality (e.g., 2) of available values. In addition, similarly, when determining PDCCH processing time, if PDCCH repetition or joint decoding (e.g., soft combining BD) is applied to DCI (e.g., SPS PDSCH release DCI, etc.) for which an A/N should be reported, a larger value may be used instead of a smaller value among a plurality (e.g., 2) of available values.

In other words, values such as N1, N2, etc. are used instead of the Z value in PDSCH processing time, PDCCH processing time, PUSCH processing time, etc., and the above proposed method may be applied to determine processing times of N1, N2, etc. For example, the values of N1 and N2 may be defined as small and large available values, respectively. According to UE capability, a UE with high capability reports and uses a small value to a base station, so that processing can be completed within a short time. Here, when PDCCH repetition or joint decoding (e.g., soft combining BD) is applied, a large value may be used while ignoring a small value. That is, even if a UE reports capability to use a small value or a condition for using a small value is satisfied, when PDCCH repetition or joint decoding (e.g., soft combining BD) is applied to DCI for scheduling a PDSCH/PUSCH or DCI the does not schedule but needs to report an A/N, a large value may be used instead of a small value.

In general, it is proposed to use a larger value among various values of the processing time when PDCCH repetition or joint decoding (e.g., soft combining BD) is applied.

In addition, different methods from among the above-described proposed methods may be applied for each specific MTRP PDCCH transmission scheme such as time domain repetition (PDCCH (carrying the same DCI) is repeatedly transmitted at different time), frequency domain repetition (PDCCH (carrying the same DCI) is repeatedly transmitted on different frequencies), and SFN (PDCCH (carrying the same DCI) is repeatedly transmitted at the same time and frequency). In addition, whether a relaxed value (e.g., Z2, etc.) is applied and a processing time value may be different for each MTRP PDCCH transmission scheme. In addition, even in the same time domain repetition method, according to an inter-slot time domain repetition method (e.g., PDCCH (carrying the same DCI) is repeatedly transmitted in different slots) or an intra-slot time domain repetition method (e.g., PDCCH (carrying the same DCI) is repeatedly transmitted in different symbols in the same slot), a different method may be applied from among the above-mentioned proposed methods, or whether a relaxed value (e.g., Z2, etc.) is applied and a processing time value may be different for each MTRP PDCCH transmission scheme.

In addition, the embodiments described in the present disclosure (e.g., Embodiments 1 to 9, etc.) may be operated independently, or any one or more embodiments may be applied in combination with each other.

Figure 8:
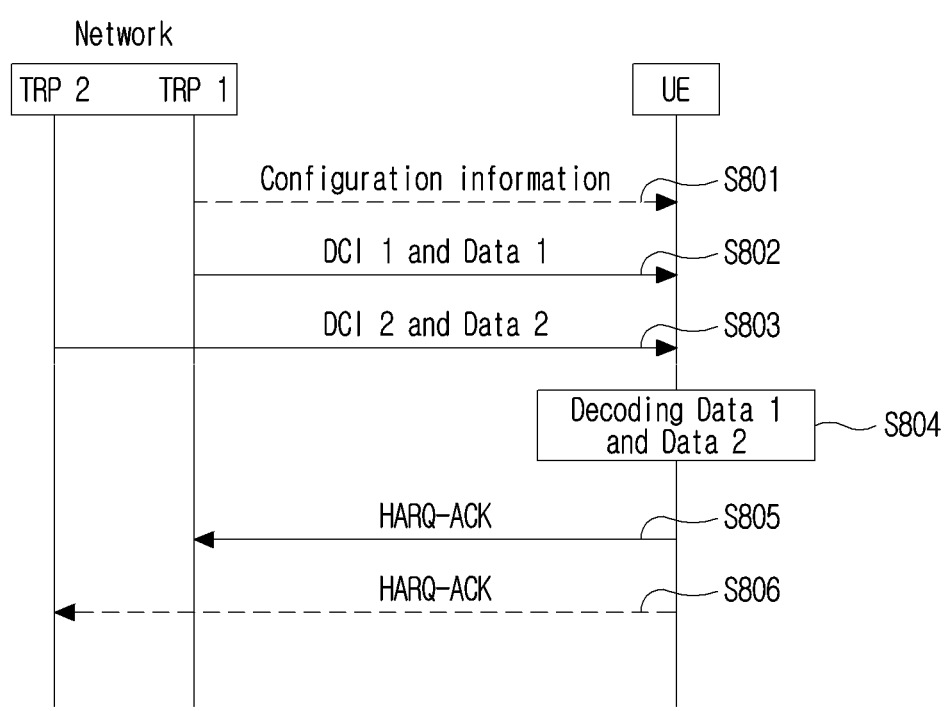
FIG. 8 illustrates a signaling procedure between a network and a UE for a method for transmitting and receiving a PDCCH according to an embodiment of the present disclosure.

FIG. 8 illustrates a signaling procedure between a network and a UE for a method for transmitting and receiving a PDCCH according to an embodiment of the present disclosure.

FIG. 8 to be described later exemplifies a signaling procedure between a network (e.g., TRP 1, TRP 2) and a terminal (i.e., UE) in a situation of multiple TRP (i.e., M-TRP, or multiple cells, hereinafter all TRP may be substituted with cells) to which the methods (e.g., Embodiments 1 to 9, etc.) proposed in the present disclosure may be applied.

Figure 11:
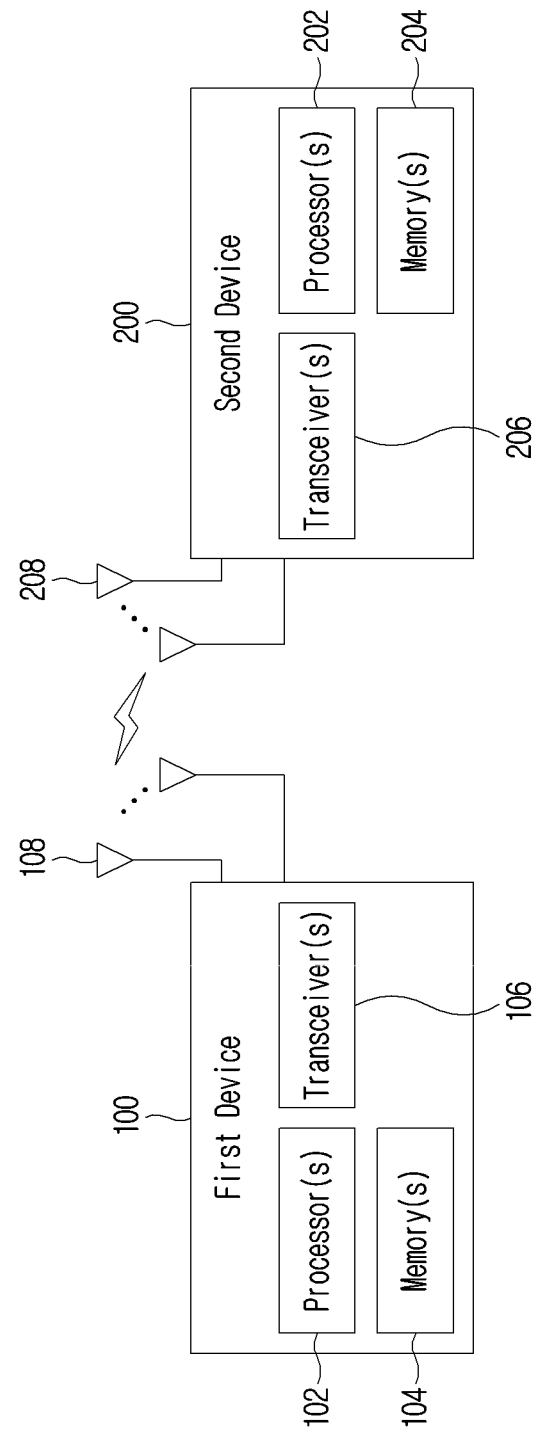
FIG. 11 illustrates a block diagram of a wireless communication device according to an embodiment of the present disclosure.

Here, UE/Network may be an example and may be applied by being substituted with a variety of devices as described in FIG. 11. FIG. 8 is only for convenience of description, but it is not intended to limit a scope of the present disclosure. In addition, some step(s) shown in FIG. 8 may be omitted according to a situation and/or a configuration, etc.

Referring to FIG. 8, signaling between two TRPs and a UE is considered for convenience of description, but of course, the signaling method may be extended and applied to signaling between multiple TRPs and multiple UEs. In the following description, a network may be one base station including a plurality of TRPs or may be one cell including a plurality of TRPs. In an example, ideal/non-ideal backhaul may be configured between TRP 1 and TRP 2 included in a network. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/explained (or may be an operation) as an operation in which a terminal receives a signal from a network (via/using TRP1/2), and an operation in which a terminal transmits a signal to TRP1/TRP2 may be interpreted/explained (or may be an operation) as an operation in which a terminal transmits a signal to a network (via/using TRP1/TRP2), and vice versa.

In addition, as described above, a "TRP" may be applied by being substituted with a panel, an antenna array, a cell (e.g., macro cell/small cell/pico cell, etc.), TP (transmission point), base station (base station, gNB, etc.), etc. As described above, a TRP may be classified according to information (e.g., index, identifier (ID)) on the CORESET group (or CORESET pool). As an example, when one terminal is configured to perform transmission/reception with a plurality of TRPs (or cells), this may mean that a plurality of CORESET groups (or CORESET pools) are configured for one terminal. The configuration of such a CORESET group (or CORESET pool) may be performed through higher layer signaling (e.g., RRC signaling, etc.). In addition, a base station may mean a generic term for an object that transmits and receives data with a terminal. For example, the base station may include one or more TPs (Transmission Points), one or more TRPs (Transmission and Reception Points), etc. In addition, a TP and/or a TRP may include a panel of a base station, a transmission and reception unit, etc.

Specifically, FIG. 8 exemplifies signaling when a UE receives multiple DCI (e.g., when each TRP transmits DCI to a UE) in an M-TRP (or cell, hereinafter all TRPs may be substituted with cells, or it may be assumed to be M-TRP even when a plurality of CORESETs are configured from one TRP) situation.

Referring to FIG. 8, a UE may receive configuration information for multiple TRP-based transmission/reception through/using TRP 1 (and/or TRP 2) from a Network (S801).

The configuration information may include information related to a configuration of a network (i.e., TRP configuration), resource information (resource allocation) related to multiple TRP-based transmission and reception, etc. Here, the configuration information may be transmitted through higher layer signaling (e.g., RRC signaling, MAC-CE, etc.). In addition, when the configuration information is predefined or preconfigured, the corresponding step may be omitted. For example, the configuration information may include, as described in the above-described proposed methods (e.g., Embodiments 1 to 9, etc.), a CORESET related configuration/CCE configuration information/search space related information/control channel (e.g., PDCCH) repetitive transmission related information (e.g., whether repeated transmission/the number of repeated transmission, etc.)/control channel (e.g., PDCCH) related resource collision/overbooking related information (e.g., the number of PDCCH candidates to be dropped upon collision/priority related information, etc.), etc.

For example, the configuration information, as described in the above-described methods (e.g., Embodiments 1 to 9, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoringSymbolsWithinSlot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included.

In addition, the configuration information is, as described in the above-described methods (e.g., Embodiments 1 to 9, etc.), may include CORESET-related configuration information (e.g., ControlResourceSet IE). The CORESET-related configuration information may include a CORESET-related ID (e.g., controlResourceSetID), an CORESET pool index for a CORESET (e.g., CORESETPoolIndex), a time/frequency resource configuration of a CORESET, TCI information related to a CORESET, etc. For example, the configuration information may include repeated transmission scheme (e.g., Repetitionscheme) information. In addition, a quasi co-location (QCL) reference signal (RS) for one or more CORESETs may be configured by the TCI information. Specifically, the TCI information may include QCL type information and/or information on a reference RS having a QCL relationship with a PDCCH DMRS port in the CORESET (or a serving cell in which the CORESET is configured).

In addition, under the assumption that two TRPs cooperate for MTRP PDCCH repeated/divided transmission as described above, a UE may be configured with i) 2 CORESETs and 2 SS sets, or ii) 1 CORESET and 1 SS set, or iii) 2 CORESETs and 1 SS set, or iv) 1 CORESET and 2 SS sets. Here, when two CORESETs are configured, each CORESET may have a different QCL configuration from each other. For example, it may have a different QCL configuration for QCL type-D (spatial reception parameter) from each other (i.e., a first QCL configuration for a first CORESET includes a first QCL type-D RS, and a second QCL configuration for a second CORESET includes a second QCL type-D RS). Alternatively, when one CORESET is configured, one CORESET may have two QCL configurations (i.e., a first QCL configuration for a single CORESET includes a first QCL type-D RS, and a second QCL configuration is a second QCL type-D RS).

In addition, the configuration information may include information on a DCI format/CSS (common SS)/USS (user-specific SS)/RNTI/PDCCH type, etc. applicable to PDCCH repeated transmission or SFN transmission as in the Embodiment 1.

A UE may receive DCI 1 and data 1 scheduled by the corresponding DCI 1 through/using TRP 1 from a network (S802). In addition, a UE may receive DCI 2 and data 2 scheduled by the corresponding DCI 2 through/using TRP 2 from a network (S803).

DCI (e.g., DCI 1, DCI 2) and Data (e.g., Data 1, Data 2) may be respectively transmitted through a control channel (e.g., PDCCH, etc.) and a data channel (e.g., PDSCH, etc.). For example, the control channel (e.g., PDCCH) may be repeatedly transmitted (i.e., the same DCI is transmitted), or the same control channel may be divided and transmitted. In addition, steps S802 and S803 may be performed simultaneously, or one may be performed earlier than the other.

In addition, although in FIG. 8, a case of transmitting data 1 and data 2 respectively in TRP 1 and TRP 2 is exemplified, the present disclosure is not limited thereto, and conversely, when a UE transmits data 1 and data 2 to TRP 1 and TRP 2, the proposed methods of the present disclosure may be applied. In addition, when only one TRP transmits data to a UE or a UE transmits data to any one TRP on the contrary, the proposed methods of the present disclosure may also be applied.

For example, the DCI 1 and the DCI 2 may include (indication) information on a TCI state, resource allocation information on a DMRS and/or data (i.e., space/frequency/time resources), etc.

As described above, TRP 1 and/or TRP 2 may transmit by repeating/dividing the same DCI. For example, PDCCH candidates for each TRP through which the DCI 1 and the DCI 2 are transmitted may correspond to different TCI states (or different QCL type D reference RSs). In other words, a control channel (e.g., PDCCH) through which the DCI 1 and the DCI 2 may be transmitted may be repeatedly transmitted based on a TDM/FDM/SDM scheme, or the same control channel may be divided and transmitted. In addition, the DCI 1 and the DCI 2 may be transmitted through a control channel (e.g., PDCCH) on the same time/frequency resource (i.e., PDCCH SFN transmission).

For example, the DCI 1 and the DCI 2 may be transmitted repeatedly (or dividedly) in a plurality of monitoring occasions (or search spaces) belonging to different search space sets described in the above-described methods (e.g., Embodiments 1 to 9, etc.). For example, in a case of repeated transmission of a PDCCH, the DCI 1 and the DCI 2 may correspond to the same DCI. Here, the same DCI may mean a DCI format including the same information. In a case of divided transmission of a PDCCH, the DCI 1 and the DCI 2 may be combined to form one DCI.

Here, different search space sets used for the repetition (or division) of the PDCCH may be associated with different CORESETs, respectively, and different QCL information for receiving the PDCCH may be configured for each CORESET. Alternatively, different search space sets used for the repetition (or division) of the PDCCH may be associated with the same single CORESET. In this case, in the single CORESET, QCL information may be configured as much as the number of search space sets associated for the PDCCH reception, or one QCL information may be configured irrespective of the number of search space sets (that is, STRP transmission).

A UE may receive a PDCCH (carrying the same DCI) for the same DCI in a first monitoring occasion (i.e., search space) of a first search space set and a second monitoring occasion (i.e., search space) of a second search space set. That is, a UE may monitor PDCCH candidates to detect the same DCI in a first monitoring occasion (i.e., search space) of a first search space set and a second monitoring occasion (i.e., search space) of a second search space set.

Here, as in the Embodiment 6, one or more monitoring occasions may overlap in a plurality of CORESETs (e.g., different QCL type-D RSs are configured) having different QCL configurations for spatial reception parameters. In this case, when a UE monitors PDCCH candidates in overlapping monitoring occasions, the UE may monitor/receive the PDCCH in a first CORESET (e.g., a first QCL type-D RS is configured) having a first QCL configuration for a spatial reception parameter and a second CORESET (e.g., a second QCL type-D RS is configured) having a second QCL configuration for a spatial reception parameter among a plurality of CORESETs. Here, the PDCCH transmitted in the first CORESET and the second CORESET may carry the same DCI.

Here, a first CORESET may be determined based on a predetermined priority rule as described above. In addition, a second CORESET may be determined as a CORESET associated with a second search space set linked to the first search space set associated with the first CORESET for transmission of a PDCCH. As described above, configuration information may include information on the linkage between a first search space set and a second search space set. In addition, a UE may monitor/receive a PDCCH in one or more other CORESETs having the same QCL configuration as a first QCL configuration (e.g., a first QCL type-D RS) and/or a second QCL configuration (e.g., a second QCL type-D RS) for a spatial reception parameter.

Also, one or more monitoring occasions may overlap in i) the first CORESET and/or the second CORESET and ii) a third CORESET. Here, a third CORESET has a plurality of QCL configurations for a spatial reception parameter (e.g., multiple QCL type-D RSs are configured), and may be a CORESET (i.e., CORESET for PDCCH SFN transmission) in which a PDCCH carrying the same DCI is transmitted based on each of the plurality of QCL configurations. In this case, for the reception of a PDCCH, i) the first CORESET and/or the second CORESET may have priority over ii) the third CORESET. That is, a UE may monitor/receive a PDCCH in the first CORESET and/or the second CORESET.

In relation to a CORESET for PDCCH SFN transmission, the descriptions of the above-described Embodiments 1 to 5 may be referred to.

A UE may decode Data 1 and Data 2 received through/using TRP 1 (and/or TRP 2) from a Network (S804). For example, a UE may perform channel estimation and/or decoding of data by applying an aggregation level/TCI state mapping, etc. according to a definition (e.g., defined based on a CORESET/SS set) of a candidate of a control channel (e.g., PDCCH).

A UE may transmit HARQ-ACK information (e.g., ACK information, NACK information, etc.) for Data 1 and/or Data 2 to a Network through/using TRP 1 and/or TRP 2 (S805, S806). In this case, HARQ-ACK information for Data 1 and Data 2 may be combined into one. In addition, a UE may be configured to transmit only HARQ-ACK information to a representative TRP (e.g., TRP 1), and transmission of HARQ-ACK information to another TRP (e.g., TRP 2) may be omitted.

The HARQ-ACK information may be transmitted through a PUCCH. Here, according to the above Embodiments, when a PDCCH is repeatedly/dividedly transmitted, a time interval from PDSCH reception to PUCCH transmission may be determined based on whether the terminal performs joint decoding for a PDCCH candidate(s) in a first CORESET and a PDCCH candidate(s) in a second CORESET. That is, since time for joint decoding a PDCCH candidate(s) in a plurality of CORESETs may be longer than time for individually decoding a PDCCH candidate(s) in one CORESET, a time interval between PDSCH reception and PUCCH transmission may be determined to be larger.

Alternatively, when a PDCCH is repeatedly/dividedly transmitted, a time interval from PDSCH reception to PUCCH transmission may be determined based on the total number of blind decoding of a UE for PDCCH candidates in a first CORESET and a second CORESET.

In addition, the DCI may include information for triggering an aperiodic CSI report, and in this case, a UE may transmit CSI to a base station through a PUSCH or a PUCCH. Here, according to the above Embodiment, when a PDCCH is repeatedly/dividedly transmitted, a CSI computation delay requirement value required for CSI computation of a UE may be determined to be larger than when DCI is transmitted through a PDCCH without repetition/division.

Alternatively, according to the above Embodiment, when a PDCCH is repeatedly/dividedly transmitted, CSI computation delay requirement value may be determined based on whether the UE performs joint decoding for a PDCCH candidate(s) in a first CORESET and a PDCCH candidate(s) in a second CORESET.

Figure 9:
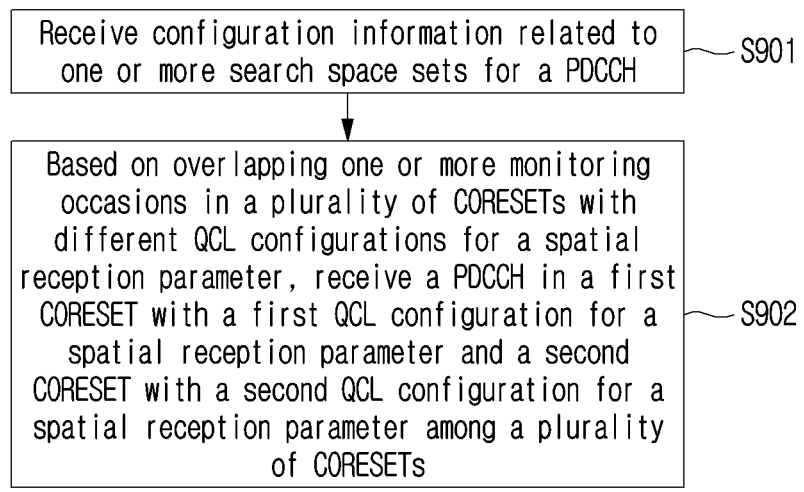
FIG. 9 is a diagram illustrating an operation of a terminal in a method for receiving a PDCCH according to an embodiment of the present disclosure.

FIG. 9 is a diagram illustrating an operation of a terminal in a method for receiving a PDCCH according to an embodiment of the present disclosure.

FIG. 9 exemplifies an operation of a terminal based on the above-described Embodiments 1 to 9. FIG. 9 is only for convenience of description, but it is not intended to limit a scope of the present disclosure. Some step(s) shown in FIG. 9 may be omitted according to a situation and/or a configuration, etc. In addition, a terminal in FIG. 9 is only one example, and may be implemented as a device illustrated in FIG. 11. For example, a processor (102/202) of FIG. 11 may control to transmit and receive channel/signal/data/information, etc. by using a transceiver (106/206), and control to store transmitted or received channel/signal/data/information in a memory (104/204).

In addition, an operation of FIG. 9 may be processed by one or more processors (102, 202) of FIG. 11. In addition, an operation of FIG. 9 may be stored in a memory (e.g., one or more memories (104, 204) of FIG. 11) in a form of an instruction/program (e.g., instruction, executable code) for driving at least one processor (e.g., 102, 202) of FIG. 11.

A terminal receives configuration information related to one or more search space sets for a PDCCH (i.e., for PDCCH (candidate) monitoring) from a base station (S901).

Here, as described in the above-described methods (e.g., Embodiements 1 to 9, etc.), the PDCCH may repeatedly transmitted (i.e., the same DCI is transmitted) or dividedly transmitted (i.e., each DCI part is combined to generate one DCI) based on an FDM/TDM/SDM scheme from multiple TRPs, or SFN transmission may be performed for the PDCCH.

The configuration information, as described in the above-described methods (e.g., Embodiments 1 to 9, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoring SymbolsWithin Slot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included.

In addition, although not shown in FIG. 9, a terminal may receive second configuration information from a base station as described in the above-described methods (e.g., Embodiments 1 to 9, etc.). Second configuration information may include CORESET-related configuration information (e.g., ControlResourceSet IE). The CORESET-related configuration information may include a CORESET-related ID (e.g., controlResourceSetID), an CORESET pool index for a CORESET (e.g., CORESETPoolIndex), a time/frequency resource configuration of a CORESET, TCI information related to a CORESET, etc. For example, the configuration information may include repeated transmission scheme (e.g., Repetitionscheme) information. In addition, a quasi co-location (QCL) reference reference signal (RS) for one or more CORESETs may be configured by the TCI information. Specifically, the TCI information may include QCL type information and/or information on a reference RS having a QCL relationship with a PDCCH DMRS port in the CORESET (or a serving cell in which the CORESET is configured).

In addition, under the assumption that two TRPs cooperate for MTRP PDCCH repeated/divided transmission as described above, a UE may be configured with i) 2 CORESETs and 2 SS sets, or ii) 1 CORESET and 1 SS set, or iii) 2 CORESETs and 1 SS set, or iv) 1 CORESET and 2 SS sets. Here, when two CORESETs are configured, each CORESET may have a different QCL configuration from each other. For example, it may have a different QCL configuration for QCL type-D (spatial reception parameter) from each other (i.e., a first QCL configuration for a first CORESET includes a first QCL type-D RS, and a second QCL configuration for a second CORESET includes a second QCL type-D RS). Alternatively, when one CORESET is configured, one CORESET may have two QCL configurations (i.e., a first QCL configuration for a single CORESET includes a first QCL type-D RS, and a second QCL configuration is a second QCL type-D RS).

In addition, configuration information may include information on a DCI format/CSS (common SS)/USS (user-specific SS)/RNTI/PDCCH type, etc. applicable to PDCCH repeated transmission or SFN transmission as in the Embodiment 1.

Based on overlapping one or more monitoring occasions in a plurality of CORESETs with different QCL configurations for a spatial reception parameter (e.g., different QCL type-D RSs are configured), a terminal receives a PDCCH in a first CORESET (e.g., a first QCL type-D RS is configured) with a first QCL configuration for a spatial reception parameter and a second CORESET (e.g., a second QCL type-D RS is configured) with a second QCL configuration for a spatial reception parameter among a plurality of CORESETs (S902).

Here, different search space sets used for repetition (or division) of the PDCCH may be associated with different CORESETs, respectively, and different QCL information for receiving the PDCCH may be configured for each CORESET.

A UE may receive a PDCCH (carrying the same DCI) for the same DCI in a first monitoring occasion (i.e., search space) of a first search space set and a second monitoring occasion (i.e., search space) of a second search space set. That is, a UE may monitor PDCCH candidates to detect the same DCI in a first monitoring occasion (i.e., search space) of a first search space set and a second monitoring occasion (i.e., search space) of a second search space set.

Here, when one or more monitoring occasions overlap in a plurality of CORESETs (e.g., different QCL type-D RSs are configured) having different QCL configurations for spatial reception parameters, and when a terminal monitors PDCCH candidates in overlapping monitoring occasions, the terminal may monitor/receive the PDCCH in a first CORESET (e.g., a first QCL type-D RS is configured) having a first QCL configuration for a spatial reception parameter and a second CORESET (e.g., a second QCL type-D RS is configured) having a second QCL configuration for a spatial reception parameter among a plurality of CORESETs.

Here, a first CORESET may be determined based on a predetermined priority rule as described above. In addition, a second CORESET may be determined as a CORESET associated with a second search space set linked to the first search space set associated with the first CORESET for transmission of a PDCCH. As described above, configuration information may include information on the linkage between a first search space set and a second search space set. In addition, a terminal may monitor/receive a PDCCH in one or more other CORESETs having the same QCL configuration as a first QCL configuration (e.g., a first QCL type-D RS) and/or a second QCL configuration (e.g., a second QCL type-D RS) for a spatial reception parameter.

Also, one or more monitoring occasions may overlap in i) the first CORESET and/or the second CORESET and ii) a third CORESET. Here, a third CORESET has a plurality of QCL configurations for a spatial reception parameter (e.g., multiple QCL type-D RSs are configured), and may be a CORESET (i.e., CORESET for PDCCH SFN transmission) in which a PDCCH carrying the same DCI is transmitted based on each of the plurality of QCL configurations. In this case, for the reception of a PDCCH, i) the first CORESET and/or the second CORESET may have priority over ii) the third CORESET. That is, a terminal may monitor/receive a PDCCH in the first CORESET and/or the second CORESET.

Thereafter, a terminal may receive a PDSCH from a base station based on the received PDCCH (i.e., DCI), and transmit HARQ-ACK information for the PDSCH to the base station through a PUCCH.

Here, when a PDCCH is repeatedly/dividedly transmitted, a time interval from PDSCH reception to PUCCH transmission may be determined based on whether the terminal performs joint decoding for a PDCCH candidate(s) in a first CORESET and a PDCCH candidate(s) in a second CORESET. That is, since time for joint decoding a PDCCH candidate(s) in a plurality of CORESETs may be longer than time for individually decoding a PDCCH candidate(s) in one CORESET, a time interval between PDSCH reception and PUCCH transmission may be determined to be larger. A terminal may transmit information on whether to perform joint decoding to a base station.

Alternatively, when a PDCCH is repeatedly/dividedly transmitted, a time interval from PDSCH reception to PUCCH transmission may be determined based on the total number of blind decoding of a terminal for PDCCH candidates in a first CORESET and a second CORESET. A terminal may transmit information on the total number of blind decoding to a base station.

In addition, the DCI may include information for triggering an aperiodic CSI report, and in this case, a terminal may transmit CSI to a base station through a PUSCH or a PUCCH. Here, when a PDCCH is repeatedly/dividedly transmitted, a CSI computation delay requirement value required for CSI computation of a terminal may be determined to be larger than when DCI is transmitted through a PDCCH without repetition/division.

Alternatively, when a PDCCH is repeatedly/dividedly transmitted, CSI computation delay requirement value may be determined based on whether the terminal performs joint decoding for a PDCCH candidate(s) in a first CORESET and a PDCCH candidate(s) in a second CORESET.

Figure 10:
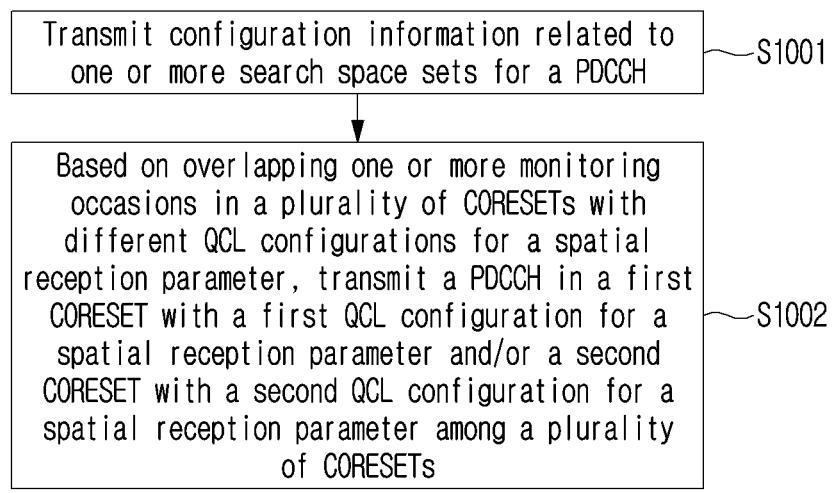
FIG. 10 is a diagram illustrating an operation of a base station in a method for transmitting a PDCCH according to an embodiment of the present disclosure.

FIG. 10 is a diagram illustrating an operation of a base station in a method for transmitting a PDCCH according to an embodiment of the present disclosure.

FIG. 10 exemplifies an operation of a base station based on the above-described Embodiments 1 to 9. FIG. 10 is only for convenience of description, but it is not intended to limit a scope of the present disclosure. Some step(s) shown in FIG. 10 may be omitted according to a situation and/or a configuration, etc. In addition, a base station in FIG. 10 is only one example, and may be implemented as a device illustrated in FIG. 11. For example, a processor (102/202) of FIG. 11 may control to transmit and receive channel/signal/data/information, etc. by using a transceiver (106/206), and control to store transmitted or received channel/signal/data/information in a memory (104/204).

In addition, an operation of FIG. 19 may be processed by one or more processors (102, 202) of FIG. 11. In addition, an operation of FIG. 10 may be stored in a memory (e.g., one or more memories (104, 204) of FIG. 11) in a form of an instruction/program (e.g., instruction, executable code) for driving at least one processor (e.g., 102, 202) of FIG. 11.

A base station transmits configuration information related to one or more search space sets for a PDCCH (i.e., for PDCCH (candidate) monitoring) to a terminal (S1001).

Here, as described in the above-described methods (e.g., Embodiements 1 to 9, etc.), the PDCCH may repeatedly transmitted (i.e., the same DCI is transmitted) or dividedly transmitted (i.e., each DCI part is combined to generate one DCI) based on an FDM/TDM/SDM scheme from multiple TRPs, or SFN transmission may be performed for the PDCCH.

If each of multiple TRPs corresponds to a different base station, a PDCCH may be transmitted from different base stations as described in the above-described methods (e.g., Embodiments 1 to 9, etc.). On the other hand, if multiple TRPs correspond to one base station (e.g., when multiple TRPs correspond to different cells in each base station), a PDCCH is transmitted from different TRPs as described in the above-described methods (e.g., Embodiments 1 to 9, etc.), but may be transmitted from one base station.

The configuration information, as described in the above-described methods (e.g., Embodiments 1 to 9, etc.), may include configuration information (e.g., SearchSpace) related to each search space (set) of one or more search space sets configured for a UE. The configuration information related to search space (set) may provide with information on a search space index (e.g., searchSpaceId), CORESET information (eg, controlResourceSetId) associated with the corresponding search space set, a PDCCH monitoring period in units of slots and a PDCCH monitoring offset (e.g., monitoringSlotPeriodicityAndOffset), an in-slot PDCCH monitoring pattern indicating the first symbol(s) of a CORESET in a slot for PDCCH monitoring (monitoringSymbolsWithinSlot), the number (duration) of consecutive slots in which the corresponding search space set continues, etc.

In addition, the configuration information may include linkage/association information between search space sets in which monitoring occasions (i.e., search spaces) for transmission (or monitoring) of a PDCCH that is repeatedly (or dividedly) transmitted for the same DCI (i.e., carrying the same DCI) are included.

In addition, although not shown in FIG. 10, a base station may transmit second configuration information to a terminal as described in the above-described methods (e.g., Embodiments 1 to 9, etc.). Second configuration information may include CORESET-related configuration information (e.g., ControlResourceSet IE). The CORESET-related configuration information may include a CORESET-related ID (e.g., controlResourceSetID), an CORESET pool index for a CORESET (e.g., CORESETPoolIndex), a time/frequency resource configuration of a CORESET, TCI information related to a CORESET, etc. For example, the configuration information may include repeated transmission scheme (e.g., Repetitionscheme) information. In addition, a quasi co-location (QCL) reference reference signal (RS) for one or more CORESETs may be configured by the TCI information. Specifically, the TCI information may include QCL type information and/or information on a reference RS having a QCL relationship with a PDCCH DMRS port in the CORESET (or a serving cell in which the CORESET is configured).

In addition, under the assumption that two TRPs cooperate for MTRP PDCCH repeated/divided transmission as described above, a UE may be configured with i) 2 CORESETs and 2 SS sets, or ii) 1 CORESET and 1 SS set, or iii) 2 CORESETs and 1 SS set, or iv) 1 CORESET and 2 SS sets. Here, when two CORESETs are configured, each CORESET may have a different QCL configuration from each other. For example, it may have a different QCL configuration for QCL type-D (spatial reception parameter) from each other (i.e., a first QCL configuration for a first CORESET includes a first QCL type-D RS, and a second QCL configuration for a second CORESET includes a second QCL type-D RS). Alternatively, when one CORESET is configured, one CORESET may have two QCL configurations (i.e., a first QCL configuration for a single CORESET includes a first QCL type-D RS, and a second QCL configuration is a second QCL type-D RS).

In addition, configuration information may include information on a DCI format/CSS (common SS)/USS (user-specific SS)/RNTI/PDCCH type, etc. applicable to PDCCH repeated transmission or SFN transmission as in the Embodiment 1.

Based on overlapping one or more monitoring occasions in a plurality of CORESETs with different QCL configurations for a spatial reception parameter (e.g., different QCL type-D RSs are configured), a base station transmits to a terminal a PDCCH in a first CORESET (e.g., a first QCL type-D RS is configured) with a first QCL configuration for a spatial reception parameter and/or a second CORESET (e.g., a second QCL type-D RS is configured) with a second QCL configuration for a spatial reception parameter among a plurality of CORESETs (S1002).

Here, different search space sets used for repetition (or division) of the PDCCH may be associated with different CORESETs, respectively, and different QCL information for receiving the PDCCH may be configured for each CORESET.

A base station may transmit a PDCCH (carrying the same DCI) for the same DCI in a first monitoring occasion (i.e., search space) of a first search space set and a second monitoring occasion (i.e., search space) of a second search space set. That is, a terminal may monitor PDCCH candidates to detect the same DCI in a first monitoring occasion (i.e., search space) of a first search space set and a second monitoring occasion (i.e., search space) of a second search space set.

Here, when one or more monitoring occasions overlap in a plurality of CORESETs (e.g., different QCL type-D RSs are configured) having different QCL configurations for spatial reception parameters, and when a terminal monitors PDCCH candidates in overlapping monitoring occasions, a base station may transmit the PDCCH in a first CORESET (e.g., a first QCL type-D RS is configured) having a first QCL configuration for a spatial reception parameter and a second CORESET (e.g., a second QCL type-D RS is configured) having a second QCL configuration for a spatial reception parameter among a plurality of CORESETs.

Here, a first CORESET may be determined based on a predetermined priority rule as described above. In addition, a second CORESET may be determined as a CORESET associated with a second search space set linked to the first search space set associated with the first CORESET for transmission of a PDCCH. As described above, configuration information may include information on the linkage between a first search space set and a second search space set. In addition, a base station may transmit a PDCCH in one or more other CORESETs having the same QCL configuration as a first QCL configuration (e.g., a first QCL type-D RS) and/or a second QCL configuration (e.g., a second QCL type-D RS) for a spatial reception parameter.

Also, one or more monitoring occasions may overlap in i) the first CORESET and/or the second CORESET and ii) a third CORESET. Here, a third CORESET has a plurality of QCL configurations for a spatial reception parameter (e.g., multiple QCL type-D RSs are configured), and may be a CORESET (i.e., CORESET for PDCCH SFN transmission) in which a PDCCH carrying the same DCI is transmitted based on each of the plurality of QCL configurations. In this case, for the reception of a PDCCH, i) the first CORESET and/or the second CORESET may have priority over ii) the third CORESET. That is, a terminal may monitor/receive a PDCCH in the first CORESET and/or the second CORESET and a base station may also recognize the operation of such a terminal.

Thereafter, a base station may transmit a PDSCH to a terminal based on the transmitted PDCCH (i.e., DCI), and receive HARQ-ACK information for the PDSCH from the terminal through a PUCCH.

Here, when a PDCCH is repeatedly/dividedly transmitted, a time interval from PDSCH reception to PUCCH transmission may be determined based on whether the terminal performs joint decoding for a PDCCH candidate(s) in a first CORESET and a PDCCH candidate(s) in a second CORESET. That is, since time for joint decoding a PDCCH candidate(s) in a plurality of CORESETs may be longer than time for individually decoding a PDCCH candidate(s) in one CORESET, a time interval between PDSCH reception and PUCCH transmission may be determined to be larger. A terminal may transmit information on whether to perform joint decoding to a base station.

Alternatively, when a PDCCH is repeatedly/dividedly transmitted, a time interval from PDSCH reception to PUCCH transmission may be determined based on the total number of blind decoding of a terminal for PDCCH candidates in a first CORESET and a second CORESET. A base station may receive information on the total number of blind decoding from a terminal.

In addition, the DCI may include information for triggering an aperiodic CSI report, and in this case, a base station may receive CSI from a terminal through a PUSCH or a PUCCH. Here, when a PDCCH is repeatedly/dividedly transmitted, a CSI computation delay requirement value required for CSI computation of a terminal may be determined to be larger than when DCI is transmitted through a PDCCH without repetition/division.

Alternatively, when a PDCCH is repeatedly/dividedly transmitted, CSI computation delay requirement value may be determined based on whether the terminal performs joint decoding for a PDCCH candidate(s) in a first CORESET and a PDCCH candidate(s) in a second CORESET. A base station may receive information on whether a terminal performs joint decoding from the terminal.

General Device to which the Present Disclosure May be Applied

FIG. 11 illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts disclosed in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device XXX, YYY of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device XXX, YYY of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of receiving a physical downlink control channel (PDCCH) in a wireless communication system, the method performed by a terminal and comprising:
   receiving, from a base station, configuration information related to a plurality of search space sets for the PDCCH; and
   based on i) one or more monitoring occasions in a plurality of control resource sets (CORESETs) with different QCL (quasi co-location) configurations for a spatial reception parameter being overlapped and ii) the terminal being configured to monitor overlapping CORESETs with the different QCL configurations for the spatial reception parameter, monitoring PDCCHs only in a first CORESET with a first QCL configuration for the spatial reception parameter and a second CORESET with a second QCL configuration for the spatial reception parameter among the plurality of CORESETs,
   wherein the first CORESET is determined based on a predetermined priority rule,
   wherein the second CORESET is determined as a CORESET associated with a second search space set linked to a first search space set associated with the first CORESET for transmission of the PDCCH, and
   wherein the configuration information includes information on the link between the first search space set and the second search space set.

2. The method of claim 1, wherein the second QCL configuration includes information on a reference signal of QCL type-D different from the first QCL configuration.

3. The method of claim 1, further comprising:
   receiving, from the base station, PDCCHs in one or more other CORESETs with the same QCL configuration as the first QCL configuration and/or the second QCL configuration for the spatial reception parameter.

4. The method of claim 1, wherein the PDCCHs transmitted in the first CORESET and the second CORESET carries the same downlink control information (DCI).

5. The method of claim 4, further comprising:
   receiving, from the base station, a physical downlink shared channel (PDSCH) based on the DCI; and transmitting, to the base station, a physical uplink control channel (PUCCH) carrying hybrid automatic repeat and request (HARQ) acknowledgment (ACK) information for the PDSCH.

6. The method of claim 5, a time interval from receiving the PDSCH to transmitting the PUCCH is determined based on whether the terminal performs joint decoding for a PDCCH candidate in the first CORESET and a PDCCH candidate in the second CORESET.

7. The method of claim 5, wherein a time interval from receiving the PDSCH to transmitting the PUCCH is determined based on the number of blind decoding of the terminal for PDCCH candidates in the first CORESET and the second CORESET.

8. The method of claim 1, wherein based on overlapping of one or more monitoring occasions in i) the first CORESET and/or the second CORESET and ii) a third CORESET, the first CORESET and/or the second CORESET has a higher priority than the third CORESET for reception of a PDCCH, and
wherein the third CORESET has a plurality of QCL configurations for the spatial reception parameter, and a PDCCH carrying the same DCI is transmitted based on each of the plurality of QCL configurations.

9. The method of claim 4, wherein the DCI includes information for triggering an aperiodic channel state information (CSI) report, and a CSI computation delay requirement value is determined to be larger than a value when the DCI is transmitted through a PDCCH without repetition.

10. The method of claim 4, wherein the DCI includes information for triggering an aperiodic CSI report, and a CSI computation delay requirement value is determined based on whether the terminal performs joint decoding for a PDCCH candidate in the first CORESET and a PDCCH candidate in the second CORESET.

11. A terminal configured to receive a physical downlink control channel (PDCCH) in a wireless communication system, the terminal comprising:
at least one transceiver for transmitting and receiving a wireless signal; and
at least one processor for controlling the at least one transceiver,
wherein the at least one processor configured to:
receive, from a base station, configuration information related to a plurality of search space sets for the PDCCH; and
based on i) one or more monitoring occasions in a plurality of control resource sets (CORESETs) with different QCL (quasi co-location) configurations for a spatial reception parameter being overlapped and ii) the terminal being configured to monitor overlapping CORESETs with the different QCL configurations for the spatial reception parameter, monitoring PDCCHs only in a first CORESET with a first QCL configuration for the spatial reception parameter and a second CORESET with a second QCL configuration for the spatial reception parameter among the plurality of CORESETs,
wherein the first CORESET is determined based on a predetermined priority rule,
wherein the second CORESET is determined as a CORESET associated with a second search space set linked to a first search space set associated with the first CORESET for transmission of the PDCCH, and
wherein the configuration information includes information on the link between the first search space set and the second search space set.

12. A base station configured to transmit a physical downlink control channel (PDCCH) in a wireless communication system, the base station comprising:
at least one transceiver for transmitting and receiving a wireless signal; and
at least one processor for controlling the at least one transceiver,
wherein the at least one processor configured to:
transmit, to a terminal, configuration information related to a plurality of search space sets for the PDCCH; and
transmit, to the terminal, PDCCHs in a plurality of control resource sets (CORESETs) with different QCL (quasi co-location) configurations for a spatial reception parameter,
wherein based on i) one or more monitoring occasions in the plurality of CORESETs being overlapped and ii) the terminal being configured to monitor overlapping CORESETs with the different QCL configurations for the spatial reception parameter, PDCCHs only in a first CORESET with a first QCL configuration for the spatial reception parameter and/or a second CORESET with a second QCL configuration for the spatial reception parameter are monitored by the terminal among the plurality of CORESETs,
wherein the first CORESET is determined based on a predetermined priority rule,
wherein the second CORESET is determined as a CORESET associated with a second search space set linked to a first search space set associated with the first CORESET for transmission of the PDCCH, and
wherein the configuration information includes information on the link between the first search space set and the second search space set.

* * * * *